(12) United States Patent
Jha et al.

(10) Patent No.: US 11,755,430 B2
(45) Date of Patent: Sep. 12, 2023

(54) METHODS AND SYSTEMS FOR STORING AND QUERYING LOG MESSAGES USING LOG MESSAGE BIFURCATION

(71) Applicant: VMWARE, INC., Palo Alto, CA (US)

(72) Inventors: Chandrashekhar Jha, Bangalore (IN); Akash Srivastava, Bengalore (IN); Yash Bhatnagar, Bangalore (IN); Navya Sree Tirunagari, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 198 days.

(21) Appl. No.: 17/184,647

(22) Filed: Feb. 25, 2021

(65) Prior Publication Data

US 2022/0222252 A1     Jul. 14, 2022

(30) Foreign Application Priority Data

Jan. 9, 2021    (IN) .............................. 202141001084

(51) Int. Cl.
*G06F 11/14*     (2006.01)
*G06F 16/2458*   (2019.01)
*G06F 16/25*     (2019.01)

(52) U.S. Cl.
CPC ...... *G06F 11/1471* (2013.01); *G06F 16/2477* (2019.01); *G06F 16/256* (2019.01)

(58) Field of Classification Search
CPC ............. G06F 11/1471; G06F 16/2477; G06F 16/256; G06F 16/2358; G06F 11/0787; G06F 11/3476; G06F 2201/835; G06F 17/40; G06F 2201/86
See application file for complete search history.

(56) References Cited

U.S. PATENT DOCUMENTS

| | | | |
|---|---|---|---|
| 10,235,372 B1* | 3/2019 | Kesarwani | G06F 8/61 |
| 2016/0301561 A1* | 10/2016 | Petersen | G06F 11/3495 |
| 2020/0364223 A1* | 11/2020 | Pal | G06F 9/5016 |
| 2021/0034497 A1* | 2/2021 | Peterson | G06F 11/324 |
| 2021/0149905 A1* | 5/2021 | Luo | G06F 16/24549 |
| 2021/0263666 A1* | 8/2021 | Yung | G06F 11/1464 |

* cited by examiner

*Primary Examiner* — Cam Y T Truong

(57) ABSTRACT

Methods and systems described herein are directed to storing and querying log messages using log message bifurcation. Each log message that exceeds a time limit for storage in a live storage database is bifurcated into a log pattern that is stored in a log-pattern database and a metric object that records variable information of the log message in a time-series metric database. The log-pattern database and the time-series metric database together provide long-term log storage for the information contained in log messages that are too old to be stored in a live storage database. A request for access to log messages stored in the long-term log storage is completed by reconstructing the requested log messages from log patterns stored in the log-pattern database and metric objects stored in the time-series metric database.

18 Claims, 30 Drawing Sheets log.write([$Time_date] [Thread-$X/$IP/INFO] [com.vmware.loginsight.commons.executor.ProcessExecutor] [ [[/usr/lib/loginsight/application/lib/apache-cassandra-2.0.10/bin/nodetool, -h, montools-prod-loginsight.vmware.com, repair]] [$Time_date] Repair session $RS for range $range finished)

[2019-03-10 23:43:36.859+0000] [Thread-1822496/127.0.0.1 INFO] [com.vmware.loginsight.commons.executor.ProcessExecutor] [ [[/usr/lib/loginsight/application/lib/apache-cassandra-2.0.10/bin/nodetool, -h, montools-prod-loginsight.vmware.com, repair]] [2015-03-10 23:43:36,716] Repair session 5131272e-c77e-11e4-ad72-4769d614a3f2 for range (-6899937477723537626, -6896547230076663429) finished]

| Log-ID | Log message |
|---|---|
| log-82tr7qbz | <99>2019-07-31T10:13:03.1926 esxi-skys-cu3-03.eng.vmware.com Urgent: 3 [71234146] HTTP:404 {'queue'. 0} |

| Log-ID | Grok pattern |
|---|---|
| log-82tr7qbz | ^\<%{INT:int}\>%{TIMESTAMP_ISO8601:timestamp_iso8601}\s%{HOSTNAME:hostname}\s%{WORD:word}\:\s%{INT:int_1}\s[\%{INT:int_2}\]\s%{WORD:word_1}\ ·\%{INT:int_3}\s{%{QS:qs}\:\s%{INT:int_4}\}$ |

| Log-ID | Log pattern |
|---|---|
| log-82tr7qbz | <<lognumber>><timestamp> esxi-skys-cu3-03.eng.vmware.com Urgent: <urgentlevel> [<number>] HTTP:<httpcode> {'queue': <queuenumber>} |

```
                            1618      1619    1601
                              /         \      /
2020-01-31T15:11:07.520+0000 ops\ingest-5db4fcc4df-qktlg ops-ingest
[priority="INFO" thread= "ops-ingest-pipeline-22"]
c.v.ingestion.host.OpsIngestServiceHost@? - /10.246.27.20:48814 POST/ops/
ingest HTTP/1.1 200 0 76.29ms                              \
                   /                                        1620
                 1621       1602
                             /
2020-01-31T15:11:07.516+0000 ops-ingest-5db4fcc4df-qktlg ops-ingest
[priority="INFO" thread= "ops-ingest-pipeline-22"]
c.v.ingestion.host.OpsIngestServiceHost@? - /10.246.27.20:41444 POST/ops/
ingest HTTP/1.1 200 0 198.66ms 1603
                             /
2020-01-31T15:11:07.515+0000 ops-ingest-5db4fcc4df-qktlg ops-ingest
[priority="INFO" thread= "ops-ingest-pipeline-58"]
c.v.ingestion.host.OpsIngestServiceHost@? - /10.246.19.69:56482 POST/ops/
ingest HTTP/1.1 200 0 177.53ms 1604
                             /
2020-01-31T15:11:07.512+0000 ops-ingest-5db4fcc4df-qktlg ops-ingest
[priority="INFO" thread= "ops-ingest-pipeline-5"]
c.v.ingestion.host.OpsIngestServiceHost@? - /10.246.0.224:55910 POST/ops/
ingest HTTP/1.1 200 0 25.55ms
```

| Log-ID | Log pattern |
|---|---|
| log-84th5hkf | \<timestamp\> ops-ingest-5db4fcc4df-qktlg ops-ingest [priority="INFO" thread= "\<thread_name\>"] c.v.ingestion.host.OpsIngestServiceHost@? - / \<host_url\> POST/ops/ingest HTTP/1.1 200 0 \<response_time\> |

| Field | Value |
|---|---|
| Log-ID | log-84th5hkf |
| Metric value | 1.0 |
| Timestamp | 2020-01-31T15:11:07.520 — 1616 |
| Point tags | thread_name: ops-ingest-pipeline-22 — 1622<br>host_url: 10.246.27.20:48814 — 1623<br>response_time: 76.29ms — 1624 |

1612 — 1606

| Field | Value |
|---|---|
| Log-ID | log-84th5hkf |
| Metric value | 1.0 |
| Timestamp | 2020-01-31T15:11:07.516 |
| Point tags | thread_name: ops-ingest-pipeline-22<br>host_url: 10.246.27.20:41444<br>response_time: 198.66ms |

1613 — 1606

| Field | Value |
|---|---|
| Log-ID | log-84th5hkf |
| Metric value | 1.0 |
| Timestamp | 2020-01-31T15:11:07.515 |
| Point tags | thread_name: ops-ingest-pipeline-58<br>host_url: 10.246.19.69:56482<br>response_time: 177.53ms |

1614 — 1606

| Field | Value |
|---|---|
| Log-ID | log-84th5hkf |
| Metric value | 1.0 |
| Timestamp | 2020-01-31T15:11:07.512 |
| Point tags | thread_name: ops-ingest-pipeline-5<br>host_url: 10.246.0.224:55910<br>response_time: 25.55ms |

FIG. 16B

METHODS AND SYSTEMS FOR STORING AND QUERYING LOG MESSAGES USING LOG MESSAGE BIFURCATION

RELATED APPLICATIONS

Benefit is claimed under 35 U.S.C. 119(a)-(d) to Foreign Application Serial No. 202141001084 filed in India entitled "METHODS AND SYSTEMS FOR STORING AND QUERYING LOG MESSAGES USING LOG MESSAGE BIFURCATION", on Jan. 9, 2021, by VMware, Inc., which is herein incorporated in its entirety by reference for all purposes.

TECHNICAL FIELD

This disclosure is directed to storing and querying log messages.

BACKGROUND

Log messages are a reliable source of information for system administrators monitoring applications executing a distributed computer system. Each log message is an unstructured or semi-structured time-stamped message that records information about the state of an operating system, state of an application, state of a service, or state of computer hardware at a point in time. Most log messages record benign events, such as input/output operations, client requests, logins, logouts, and statistical information about the execution of applications, operating systems, computer systems, and other devices executing in a distributed computing system. For example, a web server executing on a computer system generates a stream of log messages, each of which describes a date and time of a client request, web address requested by the client, IP address of the client, and may record information about the client request. Other log messages record diagnostic information, such as alarms, warnings, errors, or emergencies.

To aid system administrators and application owners with detection of problems, various log management tools have been developed to store log messages. Typical log management tools separate stored log messages into two groups: live log messages and cold log messages. Live log messages are a set of recently generated log messages with time stamps that lie within a relatively shot and recent time period and are available for quick access by administrators and application owners. Live log messages are stored in readily accessible data storage that is continuously updated by storing the most recently generated log messages and deleting log messages with time stamps beyond the time period. By contrast, cold log messages comprise log messages with time stamps beyond the time period and the log messages are stored in a separate low-cost data storage facility for the purpose of providing users access when a request is made. For example, a set of live log messages may comprise all log messages generated in the past 30 days. Cold log messages, on the other hand, comprise archived log messages with time stamps beyond 30 days.

Most log management tools save cold log messages in a cold storage system the provides log message archiving and backup. In response to a user request for log messages in cold storage, the log messages must be re-ingested from cold storage. This process is time consuming, requires manual interventions, and a user making, such a request often must wait days just to get access to the requested archived log messages. System administrators of businesses, governments, and other organizations that offer services over the Internet use log messages to perform root cause analysis ("RCA") of problems, perform troubleshooting, auditing, execute compliance checks, and perform long-term trend-analysis on their applications. These organizations cannot afford problems that result in delays or slow performance of their applications. Performance issues can frustrate users, damage a brand name, result in lost revenue, and deny people access to vital services. In the interest of maximizing efficiency in storing and accessing log messages, system administrators and application owners seek fast reliable systems and methods for storing and accessing archived log messages.

SUMMARY

Methods and systems described herein are directed to storing and querying log messages using log message bifurcation. Methods and systems optimize the amount of storage used to archive log messages and optimize the amount time to access archived log messages. Each log message that exceeds a time limit for storage in a live storage database is bifurcated into a log pattern that contains fixed segments of the log message and a metric object that records the variable segments of the log messages. The log patterns are stored in a log-pattern database. The metric objects are stored in a time-series metric database. The log-pattern database and the time-series metric database together provide long-term log storage for the information contained in log messages that are too old to be stored in a live storage database. The combination of the log-pattern database and the time-series metric database requires far less storage than conventional cold storage used to archive log messages. In addition, a request for access to log messages stored in the long-term log storage is completed by reconstructing the requested log messages from log patterns stored in the log-pattern database and metric objects stored in the time-series metric database.

DESCRIPTION OF THE DRAWINGS

FIG. 3 shows an example of a log-write instruction.

FIG. 4 shows an example of a log message generated by the log-write instruction in FIG. 3.

FIG. 16A shows example log messages and a corresponding log pattern.

FIG. 16B shows example metric objects that correspond to the log messages in FIG. 16A.

DETAILED DESCRIPTION

This disclosure is directed to methods and systems for storing and querying log messages using log message bifurcation. Log messages and log files are described below in a first subsection. An example of a log management server executed in a distributed computing system is described below in a second subsection. Conventional techniques for archiving log messages are described in a third subsection. Methods and systems for storing and querying log messages using log message bifurcation are described below in a fourth subsection.

Log Messages and Log Files

Figure 1:
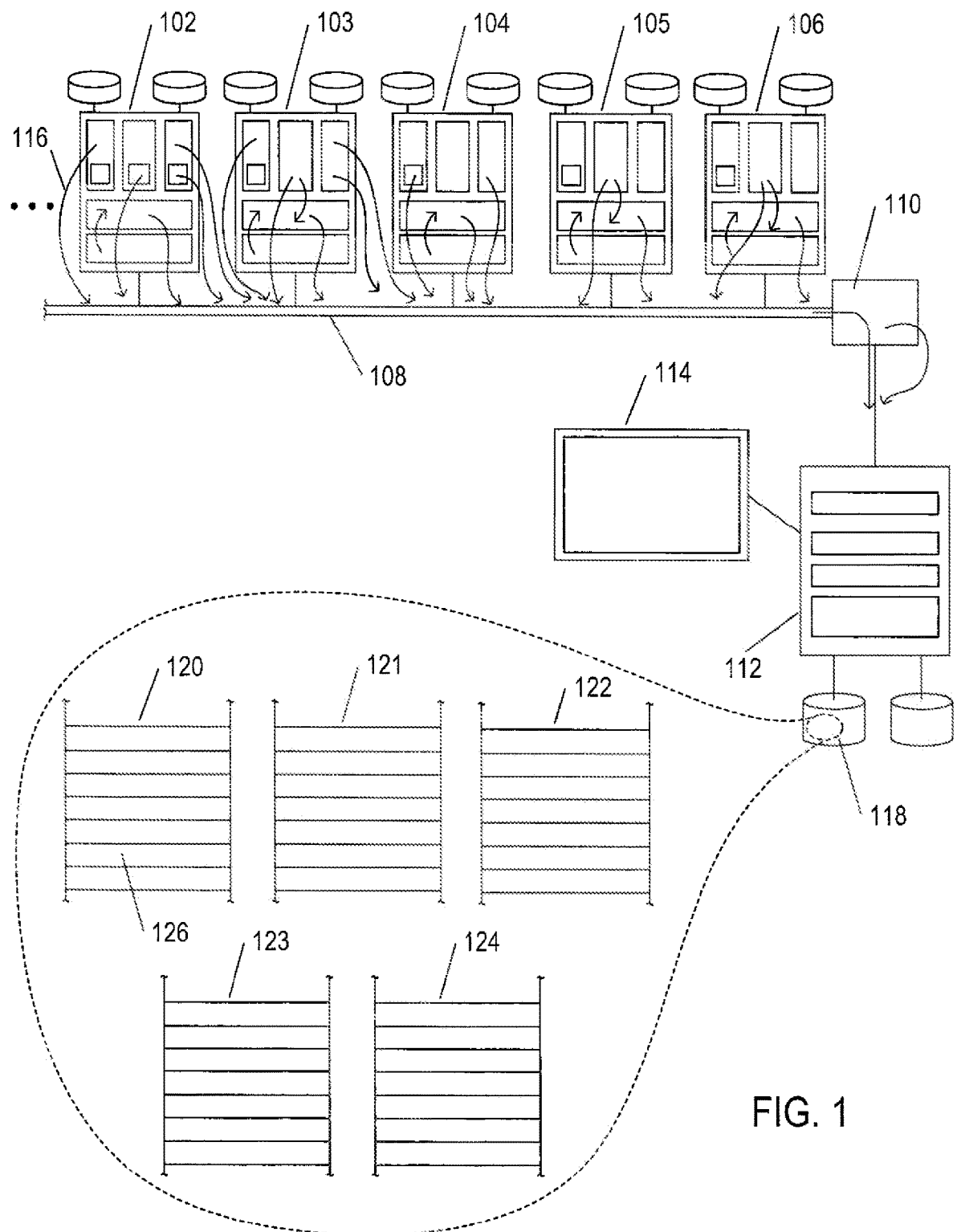
FIG. 1 shows an example of logging log messages in log files.

FIG. 1 shows an example of logging log messages in log files. In FIG. 1, computer systems 102-106 within a distributed computing system, such as data center, are linked together by an electronic communications medium 108 and additionally linked through a communications bridge/router 110 to an administration computer system 112 that includes an administrative console 114 and executes a log management server described below. Each of the computer systems 102-106 may run a log monitoring agent that forwards log messages to the log management server executing on the administration computer system 112. As indicated by curved arrows, such as curved arrow 116, multiple components within each of the discrete computer systems 102-106 as well as the communications bridge/router 110 generate log messages that are forwarded to the log management server. Log messages may be generated by any event source. Event sources may be, but are not limited to, application programs, operating systems, VMs, guest operating systems, containers, network devices, machine codes, event channels, and other computer programs or processes running on the computer systems 102-106, the bridge/router 110 and any other components of a data center. Log messages may be received by log monitoring agents at various hierarchical levels within a discrete computer system and then forwarded to the log management server executing in the administration computer system 112. The log management server records the log messages in a data-storage device or appliance 118 as log files 120-124. Rectangles, such as rectangle 126, represent individual log messages. For example, log file 120 may contain a list of log messages generated within the computer system 102. Each log monitoring agent has a configuration that includes a log path and a log parser. The log path specifies a unique file system path in terms of a directory tree hierarchy that identifies the storage location of a log file on the administration computer system 112 or the data-storage device 118. The log monitoring agent receives specific file and event channel log paths to monitor log files and the log parser includes log parsing rules to extract and format lines of the log message into log message fields described below. Each log monitoring agent sends a constructed structured log message to the log management server. The administration computer system 112 and computer systems 102-106 may function without log monitoring agents and a log management server, but with less precision and certainty.

Figure 2:
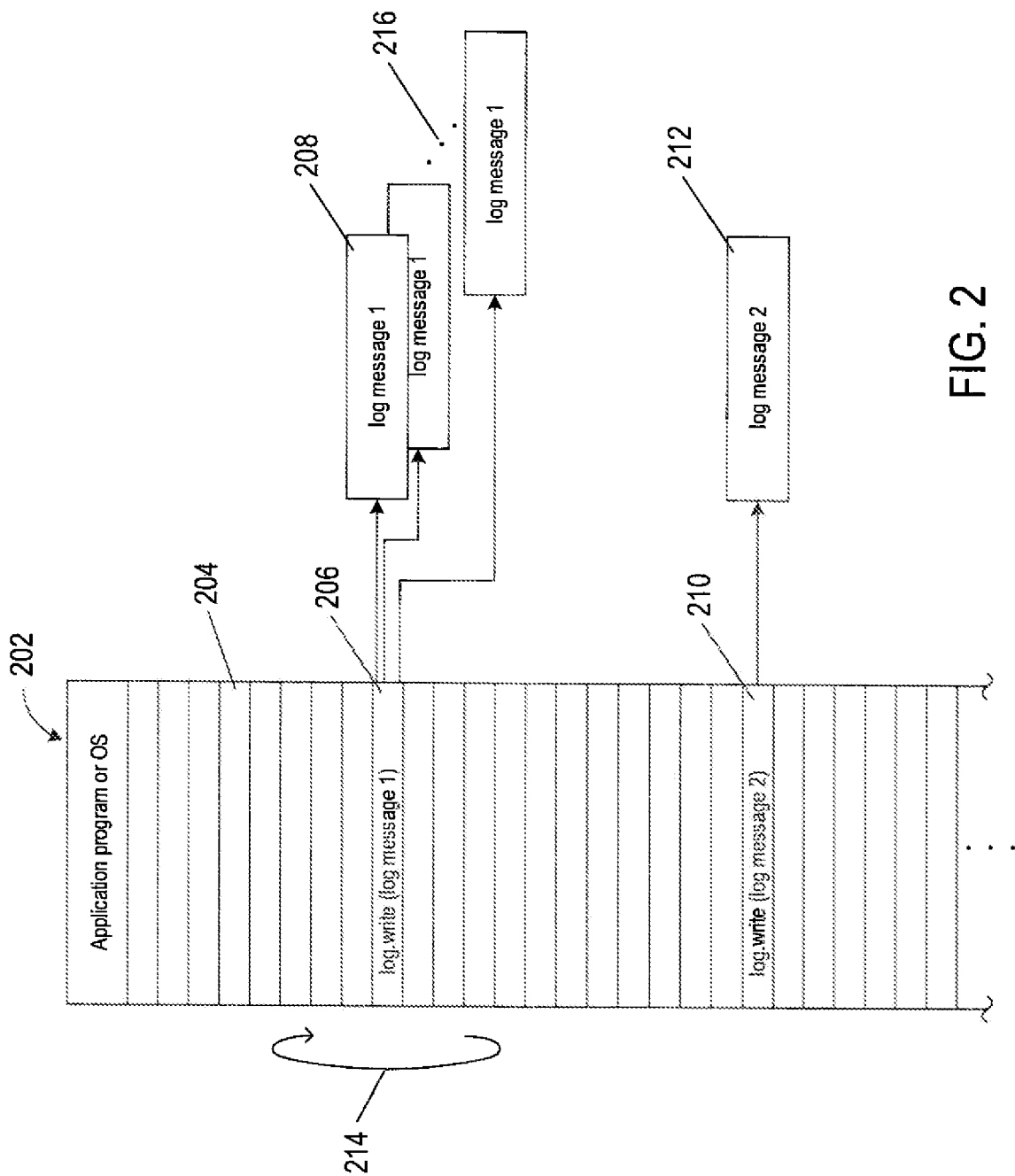
FIG. 2 shows an example source code of an event source.

FIG. 2 shows an example source code 202 of an event source, such as an application, an operating system, a VM, a guest operating system, or any other computer program or machine code that generates log messages. The source code 202 is just one example of an event source that generates log messages. Rectangles, such as rectangle 204, represent a definition, a comment, a statement, or a computer instruction that expresses some action to be executed by a computer. The source code 202 includes log-write instructions that generate log messages when certain events predetermined by a developer occur during execution of the source code 202. For example, source code 202 includes an example log-write instruction 206 that when executed generates a "log message 1" represented by rectangle 208, and a second example log-write instruction 210 that when executed generates "log message 2" represented by rectangle 212. In the example of FIG. 2, the log-write instruction 208 is embedded within a set of computer instructions that are repeatedly executed in a loop 214. As shown in FIG. 2, the same log message 1 is repeatedly generated 216. The same type of log-write instructions may also be located in different places throughout the source code, which in turns creates repeats of essentially the same type of log message in the log file.

In FIG. 2, the notation "log.write( )" is a general representation of a log-write instruction. In practice, the form of the log-write instruction varies for different programming languages. In general, the log-write instructions are determined by the developer and are unstructured or semi-structured, and in many cases are relatively cryptic. For example, log-write instructions may include instructions for time stamping the log message and contain a message comprising natural-language words and/or phrases as well as various types of text strings that represent file names, path names, and, perhaps various alphanumeric parameters that may identify objects, such as VMs, containers, or virtual network interfaces. In practice, a log-write instruction may also include the name of the source of the log message (e.g., name of the application program, operating system and version, server computer, and network device) and may include the name of the log file to which the log message is recorded. Log-write instructions may be written in a source code by the developer of an application program or operating system in order to record the state of the application program or operating system at point in time and to record events that occur while an operating system or application program is executing. For example, a developer may include log-write instructions that record informative events including, but are not limited to, identifying startups, shutdowns, I/O operations of applications or devices; errors identifying runtime deviations from normal behavior or unexpected conditions of applications or non-responsive devices; fatal events identifying severe conditions that cause premature termination; and warnings that indicate undesirable or unexpected behaviors that do not rise to the level of errors or fatal events. Problem-related log messages (i.e., log messages indicative of a problem) can be warning log messages, error log messages, and fatal log messages. Informative log messages are indicative of a normal or benign state of an event source.

FIG. 3 shows an example of a log-write instruction 302. The log-write instruction 302 includes arguments identified with "$" that are filled at the time the log message is created. For example, the log-write instruction 302 includes a time-stamp argument 304, a thread number argument 306, and an internet protocol ("IP") address argument 308. The example log-write instruction 302 also includes text strings and natural-language words and phrases that identify the level of importance of the log message 310 and type of event that triggered the log-write instruction, such as "Repair session" argument 312. The text strings between brackets "[ ]" represent file-system paths, such as path 314. When the log-write instruction 302 is executed by a log management agent, parameters are assigned to the arguments and the text strings and natural-language words and phrases are stored as a log message of a log file.

FIG. 4 shows an example of a log message 402 generated by the log-write instruction 302. The arguments of the log-write instruction 302 may be assigned numerical parameters that are recorded in the log message 402 at the time the log message is executed by the log management agent. For example, the time stamp 304, thread 306, and IP address 308 arguments of the log-write instruction 302 are assigned corresponding numerical parameters 404, 406, and 408 in the log message 402. Alphanumeric expression 410 is assigned to a repair session argument 312. The time stamp 404 represents the date and time the log message 402 is generated. The text strings and natural-language words and phrases of the log-write instruction 302 also appear unchanged in the log message 402 and may be used to identify the type of event (e.g., informative, warning, error, or fatal) that occurred during execution of the event source.

Figure 5:
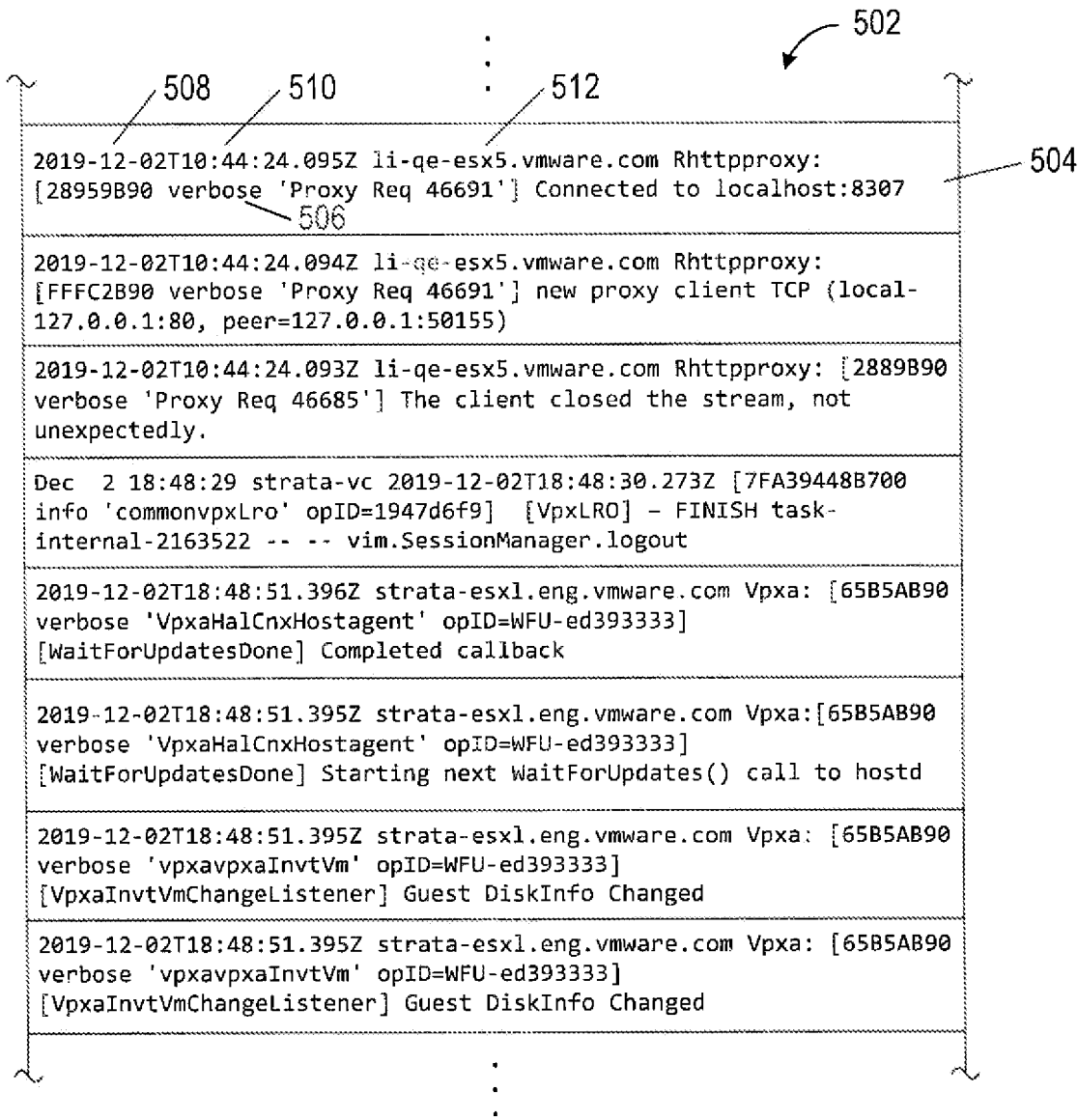
FIG. 5 shows a small, eight-entry portion of a log file.

As log messages are received from various event sources, the log messages are stored in corresponding log files in the order in which the log messages are received. FIG. 5 shows a small, eight-entry portion of a log file 502. In FIG. 5, each rectangular cell, such as rectangular cell 504, of the log file 502 represents a single stored log message. For example, log message 504 includes a short natural-language phrase 506, date 508 and time 510 numerical parameters, and an alpha-numeric parameter 512 that identifies a particular host computer.

Log Management Server

In large, distributed computing systems, such as a data center, terabytes of log messages may be generated each day. The log messages may be sent to a log management server that records the log messages in log files that are in turn stored in data-storage appliances.

Figure 6A:
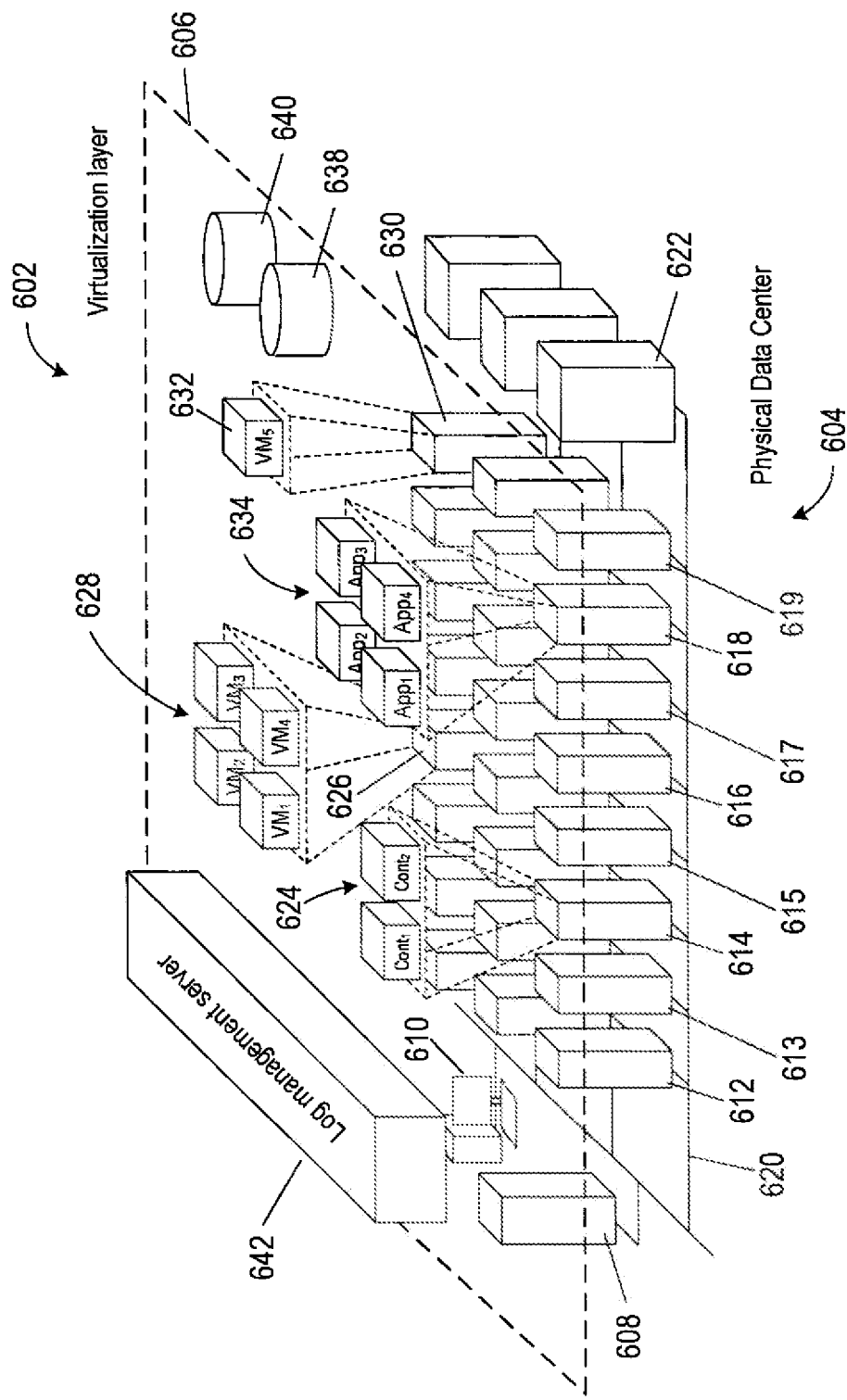
FIGS. 6A-6C show an example of the log management server receiving long messages from event sources.

FIG. 6A shows an example of a virtualization layer 602 located above a physical data center 604. For the sake of illustration, the virtualization layer 602 is separated from the physical data center 604 by a virtual-interface plane 606. The physical data center 604 is an example of a distributed computing system. The physical data center 604 comprises physical objects, including an administration computer system 608, any of various computers, such as PC 610, on which a virtual-data-center ("VDC") management interface may be displayed to system administrators and other users, server computers, such as server computers 612-619, data-storage devices, and network devices. The server computers may be networked together to form networks within the data center 604. The example physical data center 604 includes three networks that each directly interconnects a bank of eight server computers and a mass-storage array. For example, network 620 interconnects server computers 612-619 and a mass-storage array 622. Different physical data centers may include many different types of computers, networks, data-storage systems and devices connected according to many different types of connection topologies. The virtualization layer 602 includes virtual objects, such as VMs, applications, and containers, hosted by the server computers in the physical data center 604. The virtualization layer 602 may also include a virtual network (not illustrated) of virtual switches, routers, load balancers, and network interface cards formed from the physical switches, routers, and network interface cards of the physical data center 604. Certain server computers host VMs and containers as described above. For example, server computer 614 hosts two containers 624, server computer 626 hosts four VMs 628, and server computer 630 hosts a VM 632. Other server computers may host applications as described above with reference to FIG. 4. For example, server computer 618 hosts four applications 634. The virtual-interface plane 606 abstracts the resources of the physical data center 604 to one or more VDCs comprising the virtual objects and one or more virtual data stores, such as virtual data stores 638 and 640. For example, one VDC may comprise VMs 628 and virtual data store 638. Automated methods and systems described herein may be executed by a log management server 642 implemented in one or more VMs on the administration computer system 608. The log management server 642 receives log messages generated by event sources and records the log messages in log files as described below.

Figure 6B:
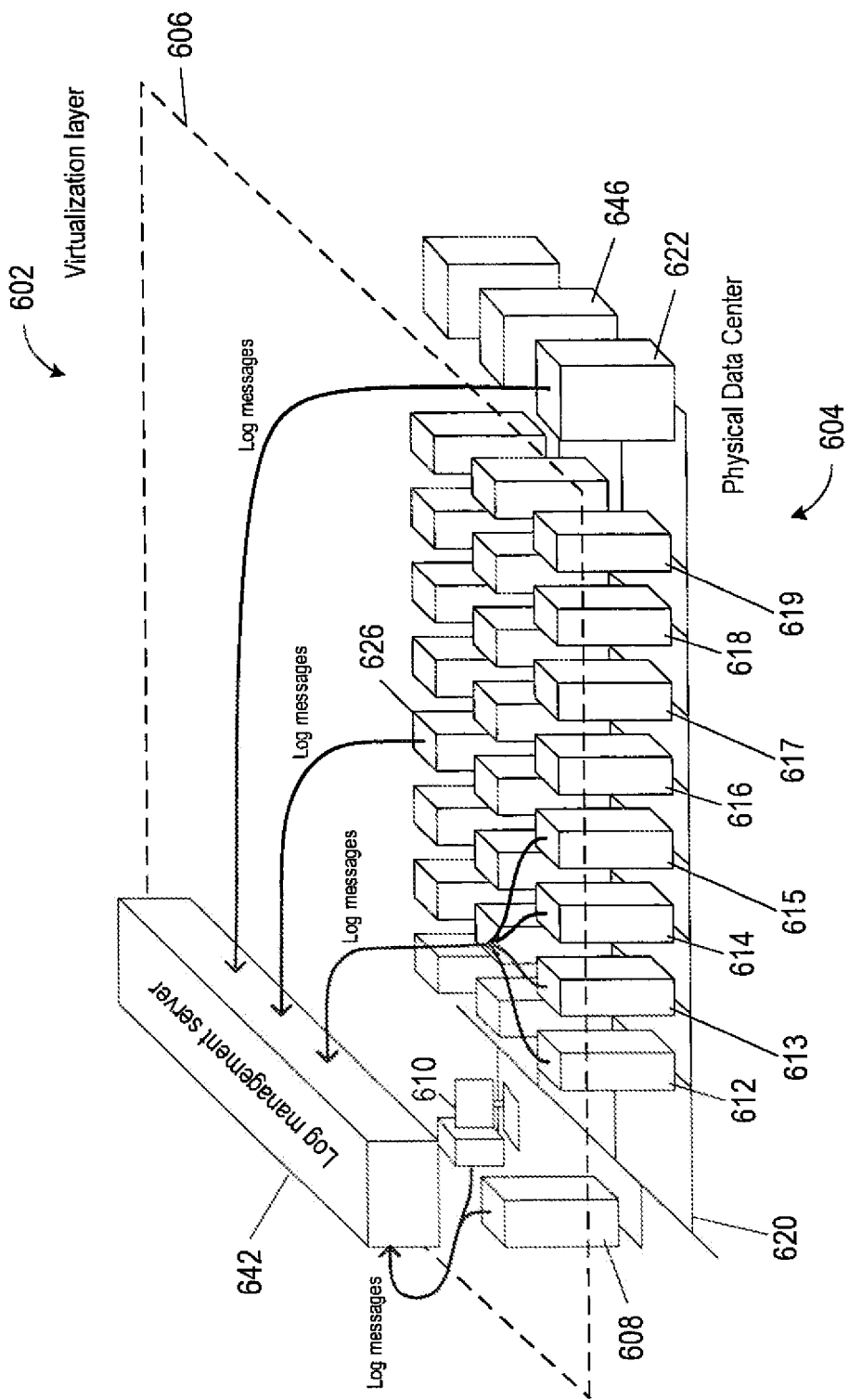
Figure 6C:
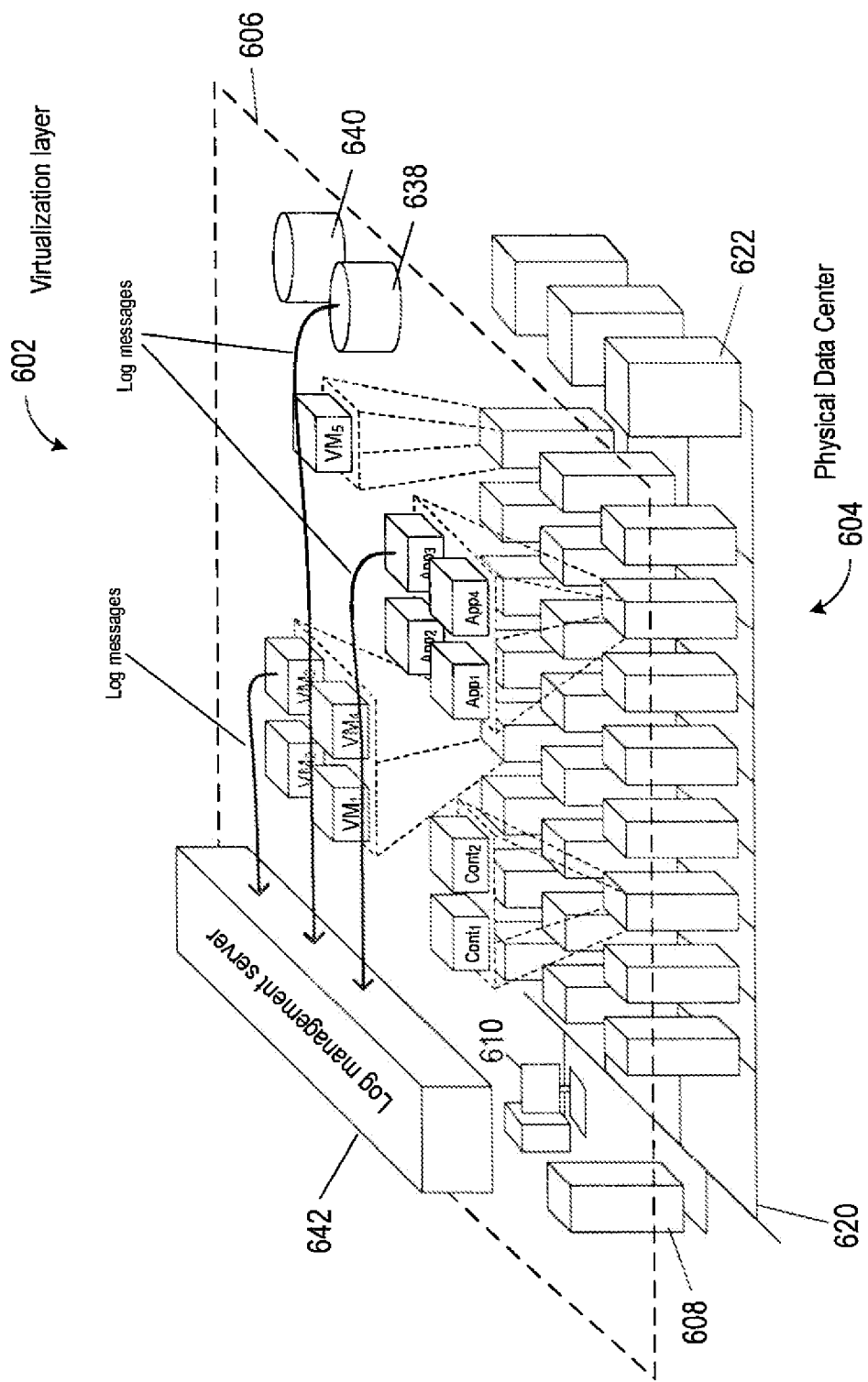

FIGS. 6B-6C show the example log management server 642 receiving log messages from event sources. Directional arrows represent log messages sent to the log management server 642. In FIG. 6B, operating systems and applications running on PC 610, server computers 608 and 644, network devices, and mass-storage array 646 send log messages to the log management server 642. Operating systems and applications running on clusters of server computers may also send log messages to the log management server 642. For example, a cluster of server computers 612-615 sends log messages to the log management server 642. In FIG. 6C, guest operating systems, VMs, containers, applications, and virtual storage may independently send log messages to the log management server 642.

Conventional Log Message Archiving

System administrators and application owners archive log messages to identify and investigate performance trends, audit security events, pinpoint periods of high demand, perform root cause analysis, and auditing to detect security issues. Archiving logs can drive cost savings while allowing an organization to extend the time frame in which you can use your log data to make informed decisions. Log message retention policies can vary from several months to several years. However, creating and maintaining a log message archive can be challenging, expensive and inefficient because of the enormous volume of log messages generated by typical applications executing in a distributed computing system, such as a data center. For example, operating systems, applications, and services associated with a typical website can generate gigabytes of log message data each day. Typical log management tools separate stored log messages into two groups: live storage for recent log messages and cold storage for older log messages. However, accesses archived log messages recorded in cold storage is a much longer and more labor-intensive process than accessing log messages in a live storage database. For example, a typical request for access to log messages recorded in cold storage involves manual operations and help from support teams and developers, which can take up to 6 days to obtain access to the archived log messages. Such long delays to just view archived log messages is a significant problem for administrators and application owners who use archived log messages to identify and investigate performance trends, audit security events, pinpoint periods of high demand, perform root cause analysis of problems, and auditing to detect security issues.

Figure 7A:
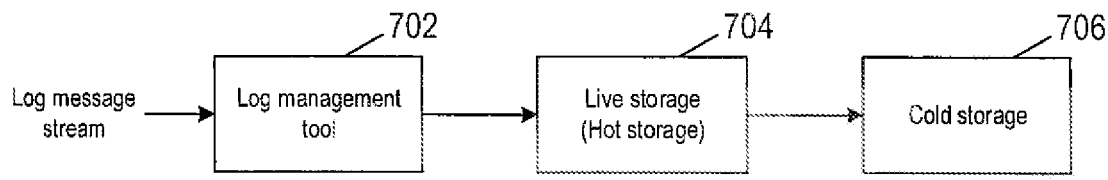
FIG. 7A shows an example of a typical method of archiving log messages.

FIG. 7A shows an example of a typical method of archiving log messages. A log management tool 702 of a log management server receives a stream of log messages generated by one or more event sources executing in a distributed computing system. The log management tool 702 sends the log messages to a live storage engine 704 that stores the log messages in live storage database called "hot storage." Log messages are continuously added to the live log storage database 704 and log messages with time stamps that exceed a time limit for live storage are copied to a low-cost cold storage 706 and deleted from the live storage database 704. Live storage allows for storage and rapid retrieval of recent log messages.

Figure 7B:
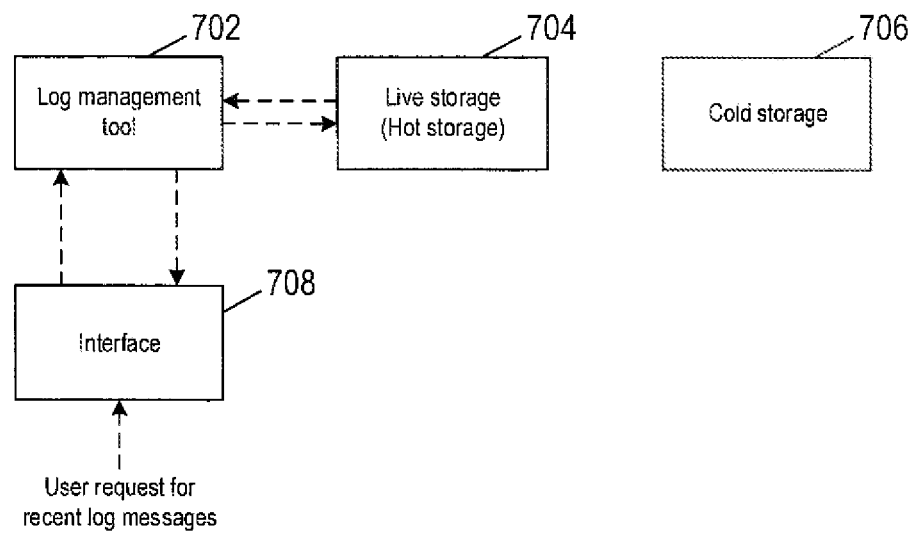
FIG. 7B shows an example of accesses log messages stored in to live storage database.

FIG. 7B shows an example of accessing log messages stored in a live storage database. A user, such as an administrator or an application owner, uses an interface 708 to submit a request for access to log messages within a query time interval that lies within a time limit for storing log messages in the live storage database. The log management tool 702 submits the query to the live storage engine 704 which rapidly responds by sending copies of the request log messages back to the interface 708. Because the log messages are stored in a live storage database, the request can be handled within seconds.

Figure 7C:
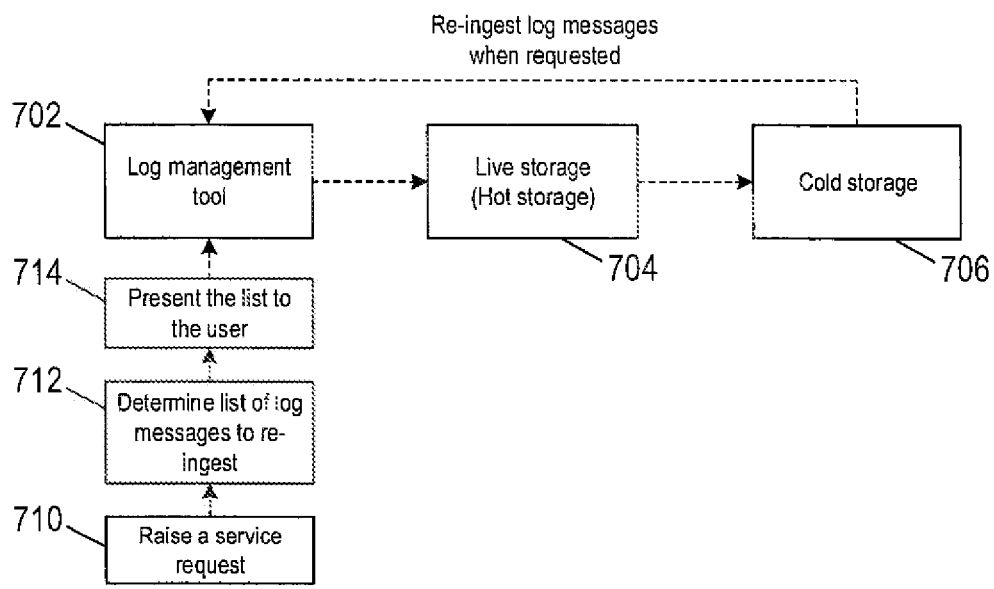
FIG. 7C shows an example of a request to retrieve log messages stored in cold storage.

FIG. 7C shows an example of a request to retrieve log messages from cold storage 706. In block 710, a user raises a service request with a support team. In block 712, the support teams interact with developers and the user to determine the precise set of log messages to re-ingest from the cold storage 706. In block 714, once the list of log messages is provided to the user, the user submits a request to re-ingest the log messages from the cold storage 706. The operations represented by blocks 710 and 712 require manual execution which often leads to a delay of 4-5 days and the re-ingestion can add another day. As a result, the total time taken to re-ingest log messages from cold storage 706 is about 5-6 days.

One way to address the time-consuming problem of accessing log messages in cold storage is to simply archive all log messages in much faster, live storage databases that provide the ability to rapidly retrieve log messages. However, this approach is not practical because of cost of maintaining a live storage database for such a large number of log messages is much higher than the cost of storing log messages in cold storage.

Methods and Systems for Storing and Querying Log Messages Using Log Message Bifurcation Methods and systems described herein are directed to storing and querying log messages using log message bifurcation as described below. Methods and systems optimize the amount of storage used to archive log messages and optimize the amount time to access archived log messages. Each log message that exceeds a time limit for storage in a live storage database is bifurcated into a log pattern that is stored in a log-pattern database and a metric object that records variable information of the log message and is stored in a time-series metric database. The log-pattern database and the time-series metric database together provide long-term log storage for the information contained in log messages that are too old to be stored in a live storage database. The combination of the log-pattern database and the time-series metric database requires far less storage than typical cold storage. In addition, a request for access to log messages stored in the long-term log storage is completed by reconstructing the requested log messages from log patterns stored in the log-pattern database and metric objects stored in the time series metric database. Methods and systems described herein enable user to request log messages from long-term log storage and receive results almost instantly. Users do not have consult support teams or coordinate with developers and do not have to wait days to retrieve log messages from cold storage. A typical request for access to log messages stored in the long-term log storage can be completed in under a minute as opposed to the much longer process of accessing the same log messages from cold storage, which can take up to 5-6 days.

Figure 8:
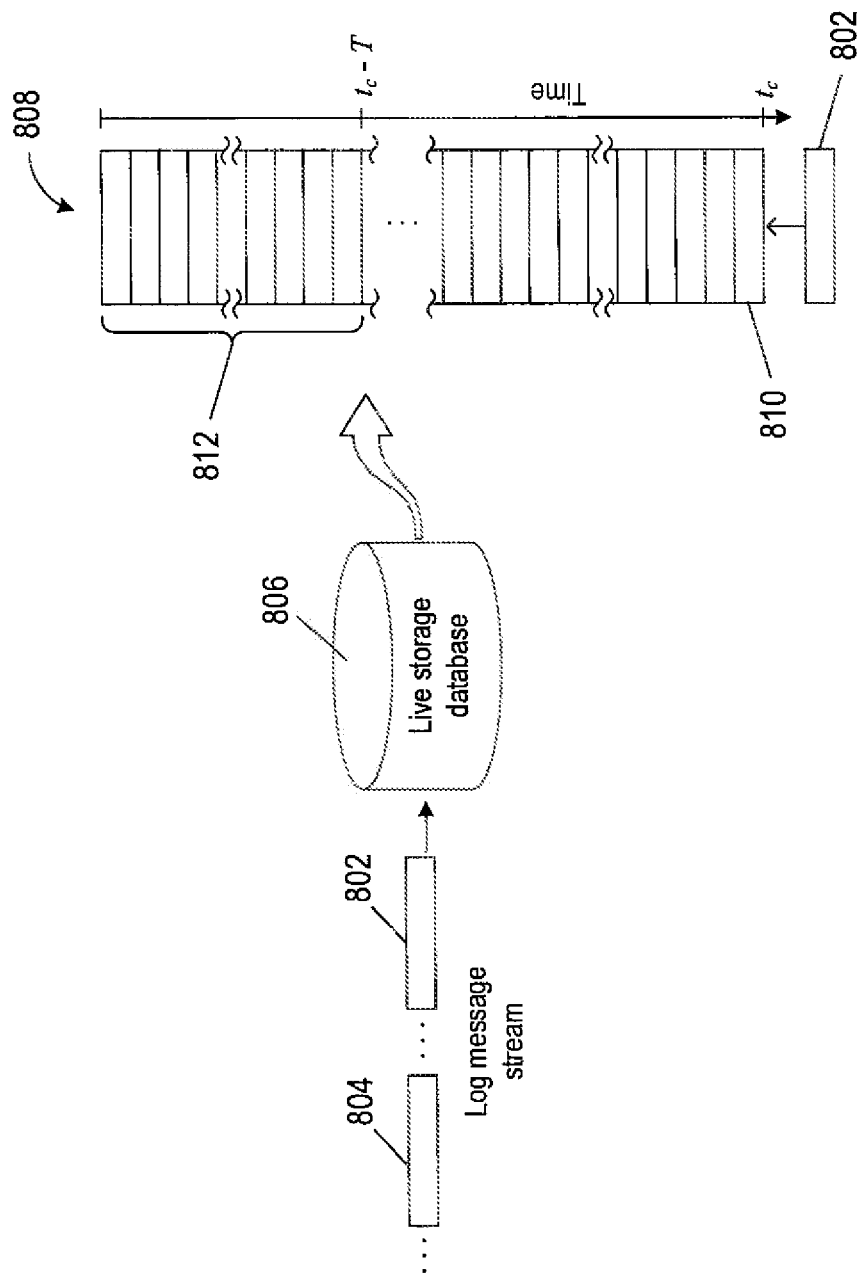
FIG. 8 shows of an example of storing log messages in a live storage database.

FIG. 8 shows of an example of storing log messages in a live storage database. Rectangles 802 and 804 represent log messages generated by one or more event sources executing in a distributed computing system and are input to a live storage database 806. Stack of rectangles 808 represents log messages stored in the live storage database 806. Each rectangle, such as rectangle 810, represents a separate log message generated by an event source. In this example, ingested log message 802 is a recently input log message to the live storage database 806. Log messages stored in the live storage database 806 have time stamps that lie within a recent time interval $[t_c-T, t_c]$ that begins at the current time $t_c$ and extends back in time to an end time $t_c-T$, where T is a duration limit or time limit on the length of time a log message may be stored in the live storage database. For example, the time limit can be a day, five days, a week, or a month and may depend on the amount of data storage available in the live storage device. The end time $t_c-T$ is a point in time that can be compared with the time stamps of log messages stored in the live storage database 806 to determined when log message should be removed from the live storage database 806. The log messages with time stamps in the recent time interval $[t_c-T, t_c]$ remain stored in the live storage database 806 and can be accessed rapidly in response to a query for log messages with time stamps in the recent time interval. However, the live storage database 806 does not retain log messages 812 with time stamps that are older than the end time $t_c-T$. In other words, such log messages exceed the time limit T for being stored in the live storage database 806. Log messages 812 with time stamps that are older than the end time of the recent time interval are saved to a separate log-message archive list and deleted from the live storage database 806.

Each log message in the log-message archine list is classified by determining if the log message matches one of many log patterns stored in a log-pattern table of a log-pattern database. If a log message in the log-message archive list does not have a corresponding log pattern in the log-pattern table, a log pattern is determined for the log message using log-message classification, a unique log identification ("log ID") is determined for the log message, and the log-pattern table is updated by recording the log pattern and log ID for the log message as a new entry in the log-pattern table. Log-message classification determines fixed segments of a log message, which are the words, phrases, or test strings of a log message that do not change. Log-message classification also determines the variable segments of a log message, which are the variable sections of the log message. A log pattern of a log message comprises the fixed segments of the log message and has placeholders that replace the variable segments of the log message. As a result, the log pattern represents a class of log messages with the same fixed segments. Creation of a log pattern and a log ID for a log message that does not already have a corresponding log pattern in the log-pattern table is performed using log message classification as described below with reference to FIGS. 9-13.

Figure 9:
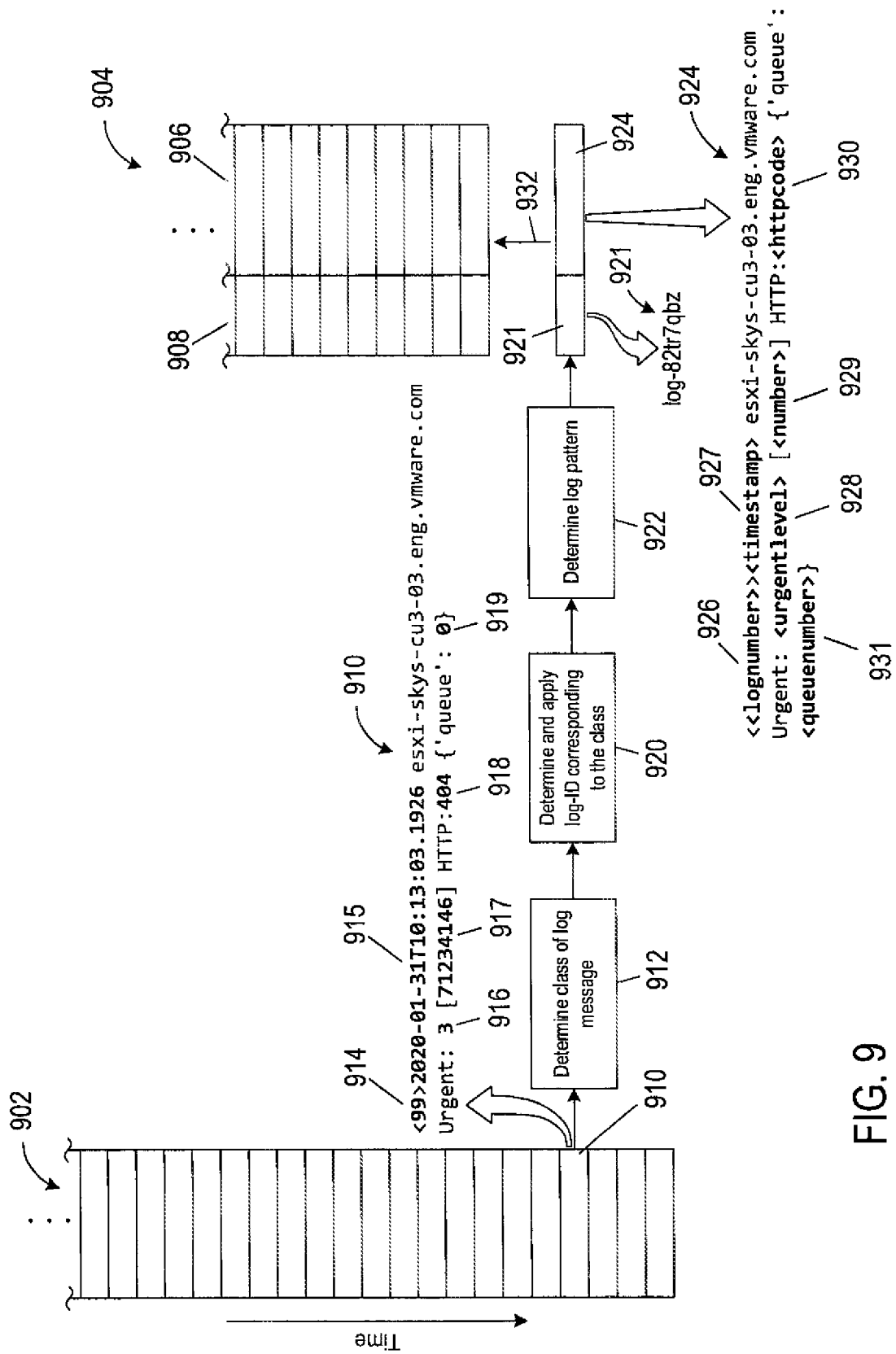
FIG. 9 shows an overview of determining a log pattern and a log identification ("log ID") for a log message.

FIG. 9 shows an overview of determining a log pattern and log ID for a log message of a log-message archive list that does not already have a corresponding log pattern in a log-pattern table. Stack of rectangles 902 represents a log-message archive list of log messages with time stamps older than the end time $t_c-T$. A log-pattern table 904 comprises different log patterns represented by column of rectangles 906 and each log pattern has a corresponding unique log ID in column 908. Each log message in the log-message archived list without a corresponding long pattern in the log-pattern table 904 is classified to determine the log pattern and the log pattern tagged with a log ID. In the example of FIG. 9, the log message 910 does not have a corresponding log pattern in the log-pattern table 904. In block 912, log classification is used to determine fixed and variable segments of the log message 910. For example, bolded segments 914-919 represent variable segments of an expanded view of the log message 910 and un-bolded segments of the log message 910 represent fixed segments of the log message 910. It should be noted that in practice the classes log messages are identified as belonging to in block 912 are not defined in advance by a system administrator, an application owner, or a user. In block 912, the classes are determined by the structure or form of the log messages and are not based on the subject matter described in the log messages. In block 920, a log ID is determined to identify the new class associated with the log message 910. In this example, the log ID used to identify the new class of log messages represented by the log message 910 is denoted by "log-82tr7qbz" 921. In block 922, a log pattern 924 is determined for the log message 910 by replacing the variable segments 914-919 with placeholders 926-931, respectively. These same placeholders are used for each log message in the same class and having the same log pattern. The log pattern 924 and associated log ID 921 are added 932 to the log-pattern table 904. The operations of classifying unclassified log messages as represented by blocks 912 and 920 is described in U.S. patent application Ser. No. 17/100,766, filed Nov. 20, 2020, owned by VMware Inc, and is herein incorporated by reference. A description of the operations performed in blocks 912 and 920 to obtain the log ID 921 and the log pattern 924 from the log message 910 is provided below with reference to FIGS. 10-13.

Methods and systems for classifying log message in block 912 includes creation of a Grok expression for the log message and using the Grok expression to determine fixed and variable segments of the log message. A grok expression is a language parsing expression that may be used to extract strings and parameters from log messages that match Grok patterns of the Grok expression. Grok expressions are formed from Grok patterns, which are in turn representations of regular expressions. A regular expression, also called "regex," is a sequence of symbols that defines a search pattern in text data. Regular expressions are specifically designed to match a particular string of characters in log messages and can be become lengthy and extremely complex. For example, because log messages are unstructured, different types of regular expressions are configured to match different character strings used to record a date and time in the time stamp portion of a log message. Grok patterns are predefined symbolic representations of regular expressions that reduce the complexity of manually constructing regular expressions. A Grok pattern is called and executed using Grok syntax notation denoted by %{Grok pattern}. Methods and system use automated determination of Grok expressions from log messages as described in U.S. patent application Ser. No. 17/008,755, filed Sep. 1, 2020 owned by VMware Inc, and is herein incorporated by reference.

Grok patterns map specific character strings into dedicated variable identifiers. Grok syntax of a Grok pattern that maps a character string of a log message to a variable identifier is given by:

%{GROK_PATTERN:variable_name} where
   GROK_PATTERN represents a Grok pattern; and
   variable_name is a variable identifier assigned to a character string in text data that matches the GROK_PATTERN.

A Grok expression is a parsing expression that is constructed from Grok patterns that match characters strings in text data and may be used to parse character strings of a log message. Consider, for example, the following simple example segment of a log message:

34.5.243.1 GET index.html 14763 0.064

A Grok expression that ma be used to parse the example segment is given by:

```
^%{IP:ip_address}\s%{WORD:
    word}\s%{URIPATHPARAM:request}\s
    %{INT:bytes}\s%{NUMBER:duration}$
```

The hat symbol "^" identifies the beginning of a Grok expression. The dollar sign symbol "$" identifies the end of a Grok expression. The symbol "\s" matches spaces between character strings in the log message. The Grok expression parses the example segment by assigning the character strings of the log message to the variable identifiers of the Grok expression as follows:

ip_address: 34.5.243.1
word: GET
request: index html
bytes: 14763
duration: 0.064

Figures 10, 11A, 11B:
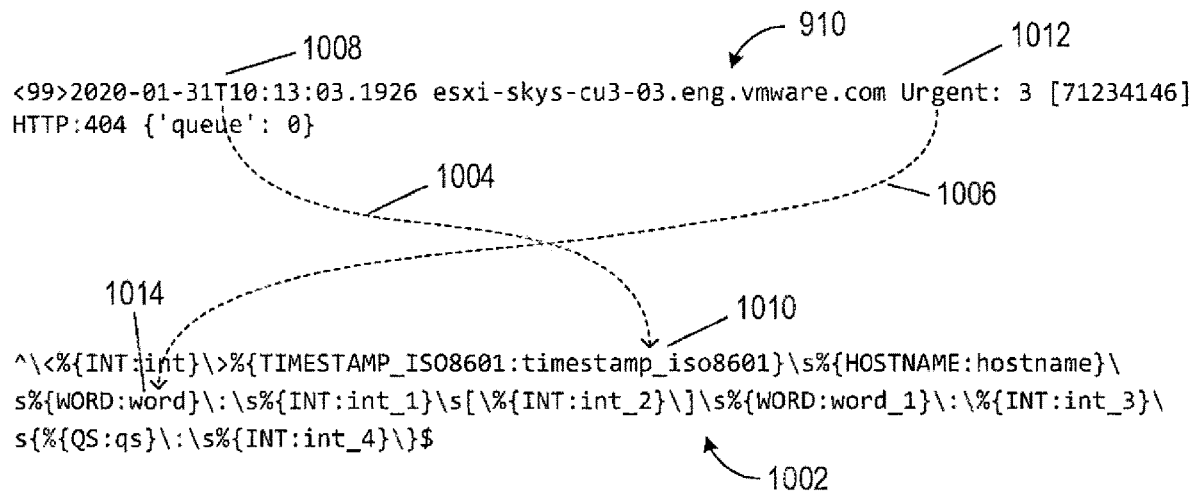
FIG. 10 shows an example of parsing a log message with a Grok expression.
FIG. 11A shows an example of a log ID associated with a long message.
FIG. 11B shows an example of a log ID assigned to a Grok expression.

Grok expressions are formed from Grok patterns and may be used to parse character strings of log messages. FIG. 10 shows an example of parsing the log message 910 with a Grok expression 1002. The Grok expression 1002 comprises Grok patterns that match the character strings of the log message 910. Dashed directional arrows 1004 and 1006 represent assigning the time stamp 2019-07-31T10:13:03.1926 1008 in the log message 906 to the variable identifier timestamp_iso8601 1010 and assigning the word Urgent 1012 in the log message 906 to the variable identifier word 1014.

A log ID is created for each log, message not represented by a log pattern in the log-pattern table. A log ID is a unique identifier that is used to identify log messages that belong to the same class of log messages and identify the log pattern associated with the class of the log message. Log ID's may comprise groups of letters and/or numbers and the groups may be separated by hyphens. Each group comprises randomly selected combinations of letters and numbers between 0 and 9. Log messages with the same associated Grok pattern are assigned the same log ID. The log ID is assigned to the Grok expression for the log message and to the log pattern of the log message.

FIG. 11A shows an example of a log ID 1102 associated with the log message 910. In this example, the log ID 1102 comprises the term "log" following by a random combination of three numbers and five letters. FIG. 11B shows the example log ID 1102 assigned to the Grok expression 1002 for the log message.

Grok patterns of a Grok expression may be used to identify fixed segments and variable segments of a log message that corresponds to the Grok expression. Fixed segments correspond to variable identifiers of Grok patterns that represent words, phrases, or text strings that do not change for each log message writing by a log-write instruction. By contrast, variable segments correspond to variable identifiers of Grok patterns that represent variables or character strings that may change for each log message written the log-write instruction.

Figures 12, 13:
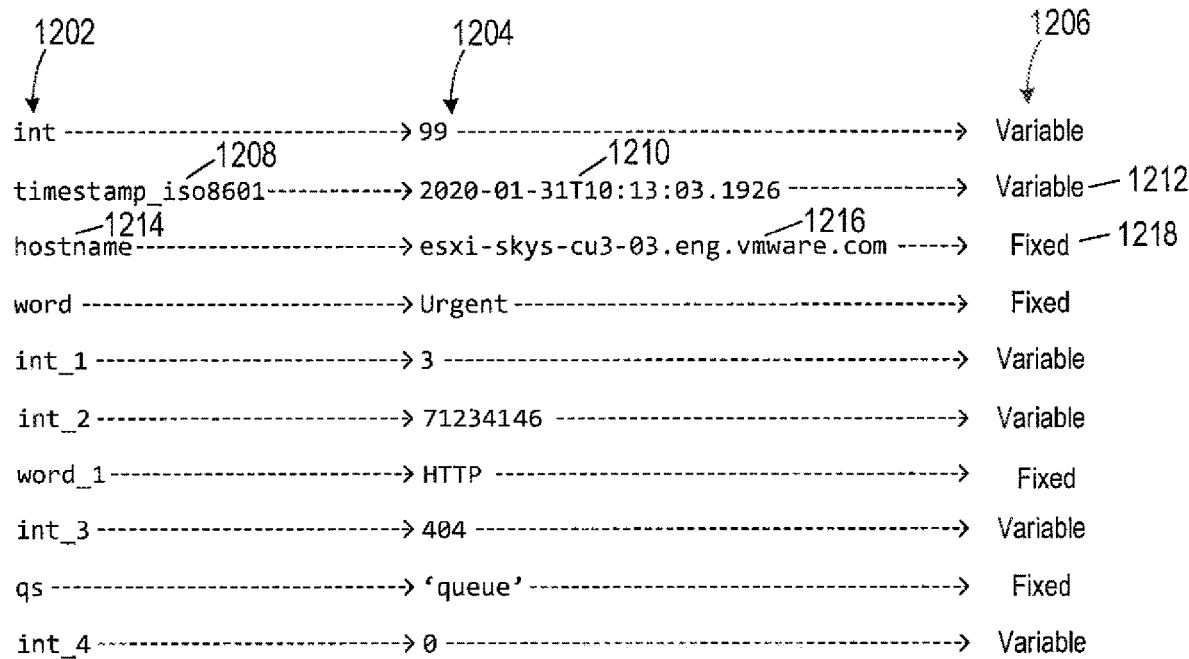
FIG. 12 shows an example of fixed and variable labels assigned to variable identifiers of a Grok expression.
FIG. 13 shows an example log pattern determined for a log message.

FIG. 12 shows an example of fixed and variable labels assigned to variable identifiers of the Grok expression 1002. Column 1202 list the variable identifiers of the Grok patterns of the Grok expression 1002. Column 1204 list the text strings assigned to the variable identifiers listed in column 1202. For example, "timestamp_iso8601" 1208 is a variable identifier for the time stamp 1210 of the log message 906, which is a variable identifier for a character string that may change. As a result, the time stamp variable identifier is labeled "Variable" 1212. As another example, "hostname" 1214 is a variable identifier for the host 1216 that generated the log message 906, which is a variable identifier that is not subject to change. As a result, the host variable identifier is labeled "Fixed" 1218.

A log pattern for a log message may be constructed based on fixed or variable labels assigned to the variable identifiers of a Grok expression associated with the log message. The log pattern of the log message may be constructed by assigning placeholders to variable segments of a log message that correspond to variable identifiers of the Grok expression identified as variable and retaining the character strings of the log message that correspond to variable identifiers of the Grok expression identified as fixed.

FIG. 13 shows the example log pattern 924 determined for the log message 910. The variable segments of the log message 910 identified in FIG. 12 have been replaced by placeholders identified with bold typeface to distinguish the placeholders from the fixed segments of the log message 910. For example, the time stamp "2020-01-31T10:13:03.1926" in the log message 910 has been replaced by a placeholder denoted by "<timestamp>." The fixed segments of the log message, such as the hostname "esxi-skys-cu3-03.eng.vmware.com," are retained in the log pattern 924. The log ID 1102 is assigned to the log pattern 924 to form the entry added to the log-pattern table 904 in FIG. 9.

Figure 14:
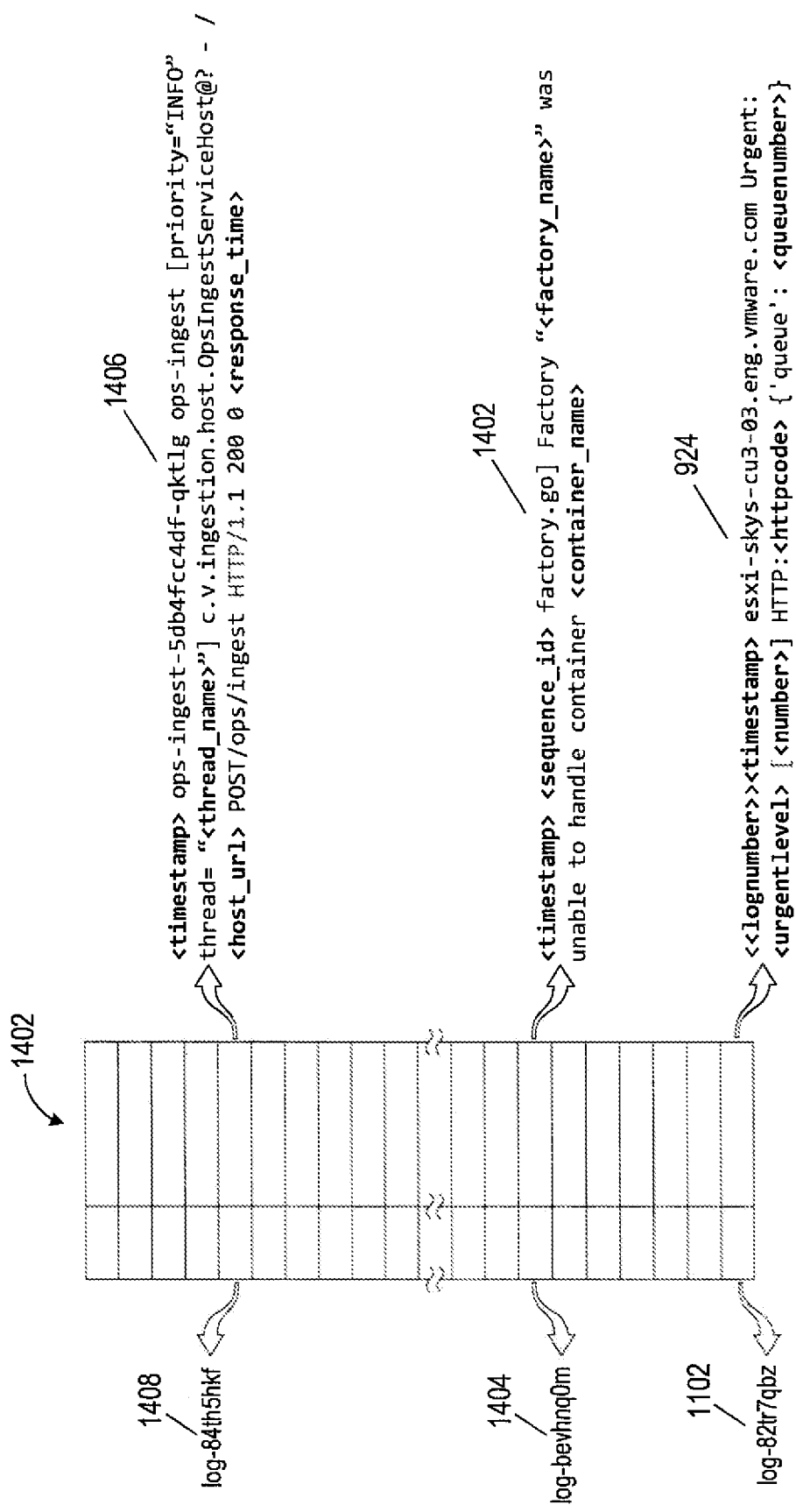
FIG. 14 shows an example log-pattern table.

Once a log pattern has been determined, the log pattern is added to the log-pattern table stored in the log-pattern database. FIG. 14 shows an example of a log-pattern table 1402 obtained after addition of the log pattern 924 and the log ID 1102. The log-pattern table shows an expanded view of an example log pattern 1402 and associated log ID 1404 and another example view of example log pattern 1406 and associated log ID 1408.

A metric object is automatically constructed for each log message in the log-message archive list and stored in a time-series metric database. A metric object of a log message records the variable segments of the log message and may be constructed from the variables extracted by variable identifiers of a Grok expression associated with the log message. For example, a metric object records a time stamp of a log message, records a log ID of a log pattern that matches the log message, and records remaining variable segments of the log message. The metric object assigns the variable segments of the corresponding log message to placeholders of the corresponding log pattern.

Figure 15:
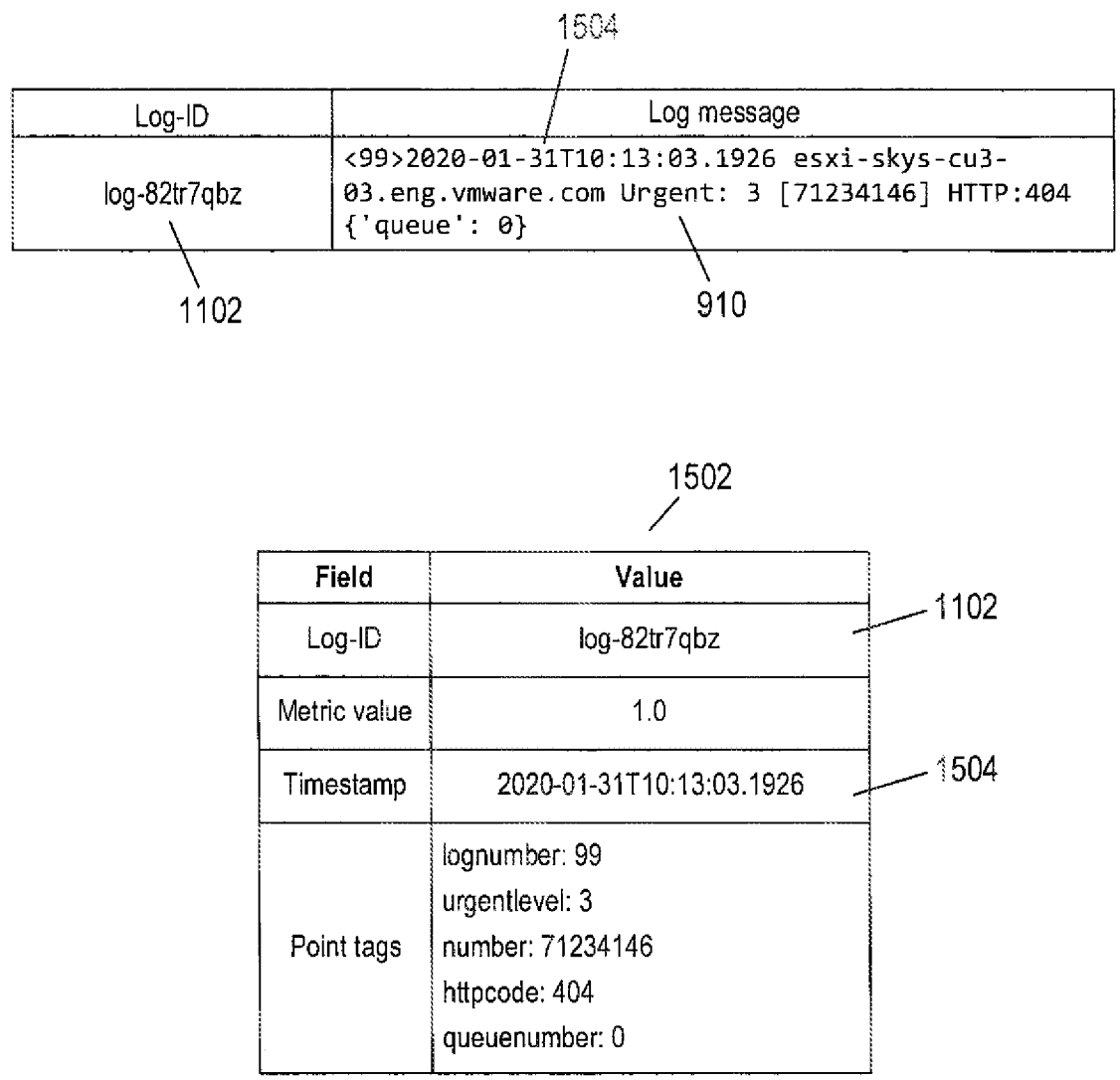
FIG. 15 shows an example metric object formed from variable segments of a log message and associated log ID.

FIG. 15 shows an example metric object 1502 formed from the variable segments of the log message 910 and the log ID 1102. The metric object 1502 includes the log ID 1102 and time stamp 1504. The metric object 1502 includes point tags that comprise the remaining variable segments of the log message 910 assigned to the placeholders in the log pattern 924. For example, placeholders "lognumber," "urgentlevel," "number," "httpcode," and "queuenumber" are assigned corresponding variable segments of the log message 910. The metric object 1502 is stored in the time-series metric database with placeholders and associated values stored as value pairs. Metric value "1.0" is used to represent when the log message was generated.

Once a log pattern and associated log ID have been added to the log-pattern table, the log pattern can be used to classify log messages in the log-message archive list using the Grok expression associated with the log pattern. For example, each log message in the log-message archive list may be compared with Grok expressions of corresponding log patterns in the log-pattern table. Once a Grok expression that parses the log message has been determined, variable identifiers of the Grok expression that correspond to variable segments of the log message are used to extract the variable segments from the log message and assign the variable segments to placeholders of a metric object that corresponds to the log message. The log ID of the log pattern that corresponds to the Grok expression is assigned to the metric object, thereby creating a correspondence between the metric object and the log pattern.

FIG. 16A shows four example log messages 1601-1604 of a log-message archive list that correspond to the log pattern 1406 in FIG. 14. The log pattern 1406 has an associated log ID 1606. Each of the log messages 1601-1604 is parsed by a Grok expression that corresponds to the log pattern 1406. The Grok expression is used to extract variable segments of the log messages 1601-1604. For example, log pattern 1406 has four placeholders identified as "timestamp," "threadname," "host_url," and "response time." The Grok expression of the log pattern 1406 can be used to extract variable segments for each of these placeholders from the log messages 1601-1604. A metric object can be constructed for each of the log messages 1601-1604 from the extracted variable segments. Values of the variable segments extracted from each of the log messages are assigned to placeholders of the corresponding metric objects. The metric objects all have the same log ID 1606 as the log pattern 1406.

FIG. 16B shows four example metric objects 1611-1614 that correspond to the log messages 1601-1604 in FIG. 16A. Each of the metric objects have the same log ID 1606 as the log pattern 1406. The time stamp of each metric object is the time stamp of a corresponding log message. For example, the time stamp 1616 of the metric object 1611 matches the time stamp 1618 of the log message 1601. The variable segments of the log messages 1601-1604 are assigned to the placeholders of the corresponding metric objects. For example, variable segments 1619-1921 of the log message 1601 are the values assigned to the placeholders 1622-1624 of the metric object 1611. Note that the log ID 1606 creates a correspondence between the log pattern 1406 and each of the metric objects 1611-1614 that enables reconstruction of the log messages 1601-1604 from the metric objects 1611-1614 and the log pattern 1406 as described below.

The log-pattern table is stored in a log-patter database that includes a software system, or logic, that maintains and manages the database as a relational database. For example, the log-pattern database may have a relational database management system ("RDBMS") that enables a search of the elements of the log-pattern table. The metric objects form a time series metric based on the time stamps of the corresponding log messages and are stored in a time-series metric database. The time-series metric database may also be an RDBMS that enables a search for each parameter of the metric objects, such log ID, timestamp, and point tags.

Bifurcating log messages where fixed segments of a class of log messages are stored in log-patterns of a log-pattern database and variable segments of each log message are stored in a time series metric database as described above, requires far less storage space than conventional cold storage. Consider, for example, a typical application, such as a website, executing in a data center. Event sources associated with the application and the application itself can generate about 100 million log messages per day, where each log message requires about 10 bytes of storage. The amount of cold storage required to save these 100 million log messages at about 10 bytes per log message is about 1 GB. An organization that owns the application stores two years of log messages to perform compliance checks and perform long-term trend-analysis on their application would require 730 GB of cold storage space. By contrast, bifurcating log messages where fixed segments of a class of log messages are stored in log-patterns of a log-pattern database and variable segments of each log message are stored in metric objects of a time-series metric database as described above takes advantage of the fact that most log messages are generated by repeated execution of the same handful of log-write instructions. For example, 100 million log messages typically correspond to about 1000 different log patterns, where each log pattern requires about 10 bytes of storage. The 100 million log messages correspond to 100 million metrics objects, but each metric object only requires about 2 bytes of storage. As a result, the total storage required to archive the information contained in 100 million log messages in a log-pattern database and a time-series metric database using bifurcation as described above is only about 200 MB. Instead of using 730 GB to archive two years of log messages in cold storage, this same information can be stored in the log-pattern database and the time series metric database using only about 146 GB of storage space for the two databases. In other words, archiving log messages in cold storage requires about 5 times more storage space than is required to store the same information contained in the log messages in a log-pattern database and a time-series metric database as described above.

Bifurcating log messages where fixed segments of a class of log messages are stored in log-patterns of a log-pattern database and variable segments of each log message are stored in corresponding metric objects of a time-series metric database as described above, provides far more rapid and reliable retrieval of log messages than the conventional approach of retrieving log messages from cold storage.

Figure 17A:
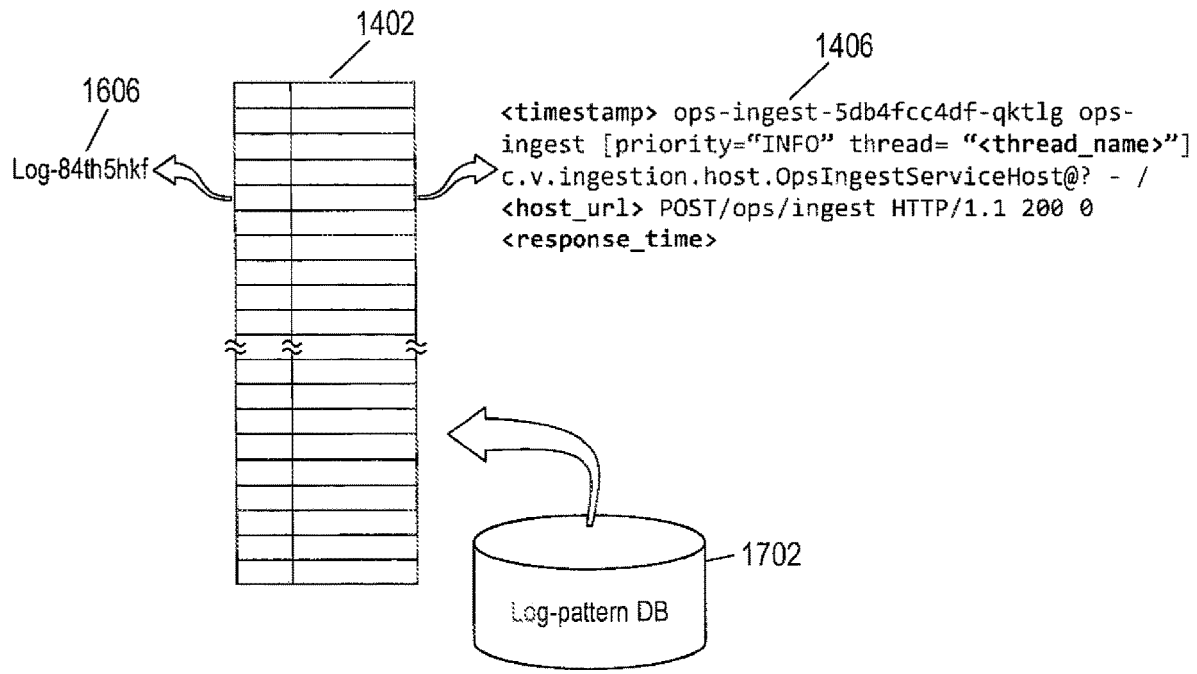
FIG. 17A shows an example of a log-pattern database used to store a log-pattern table.
Figure 17B:
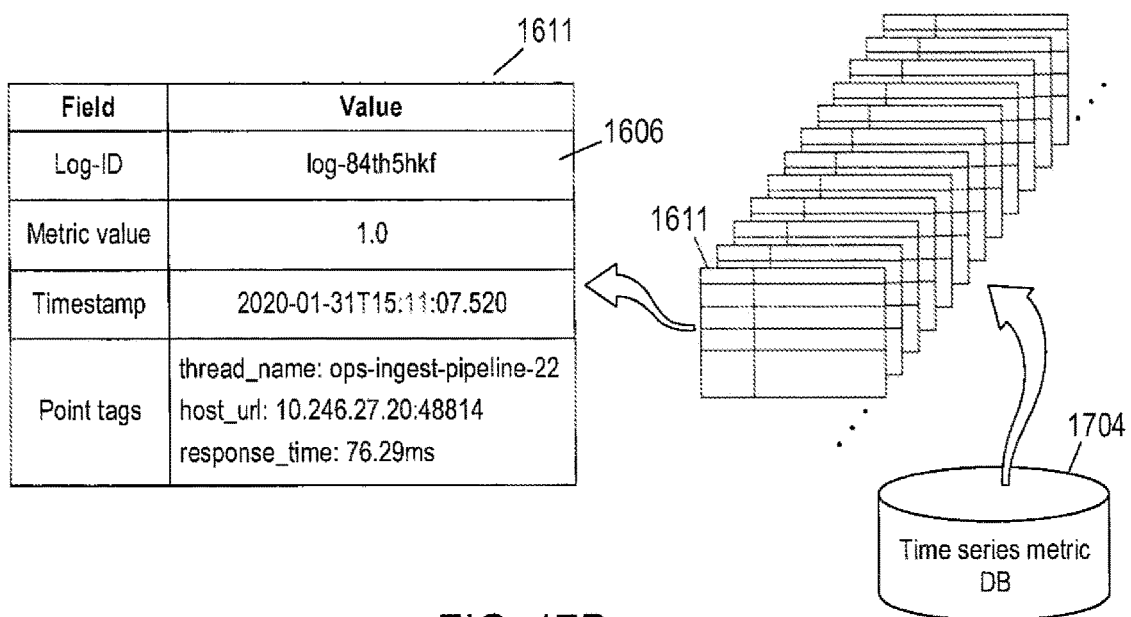
FIG. 17B shows an example of a time-series metric database that stores the metric objects of each archived log message.

FIG. 17A shows an example of a log-pattern database 1702 used to store the log-pattern table 1402 described above with reference to FIG. 14. FIG. 17B shows an example of a time-series metric database 1704 that stores the metric objects of each archived log message. The log-pattern database 1702 and the time-series metric database 1704 may both be searched using the same log ID to extract the corresponding log pattern and corresponding metric objects. The log pattern and metric objects may be used to reconstruct log messages, where each log message contains the fixed segments of the log pattern and the variable segments stored in each of the metric objects. For example, the log ID "log-84th5hkf" can be used to extract corresponding log pattern 1406 from the log-pattern database 1702 and extract corresponding metric object 1611 from the time-series metric database 1704. The values assigned to the placeholders in the metric object 1611 may assigned to corresponding placeholders of the log pattern 1406 to re-construct log message 1601 in FIG. 16A.

A request to retrieve log messages from a log pattern database and a time-series metric database may be initiated using a graphical user interface ("GUI") that enables a user to specify a start date and start time and an end date and end time of a query time interval in which log messages with time stamps in the query time interval are requested. The start date and start time are denoted by $t_{start}$ and the end date and end time are denoted by $t_{end}$. The start date and time and end date and time define limits of the query time interval denoted by $[t_{start}, t_{end}]$.

Figure 18:
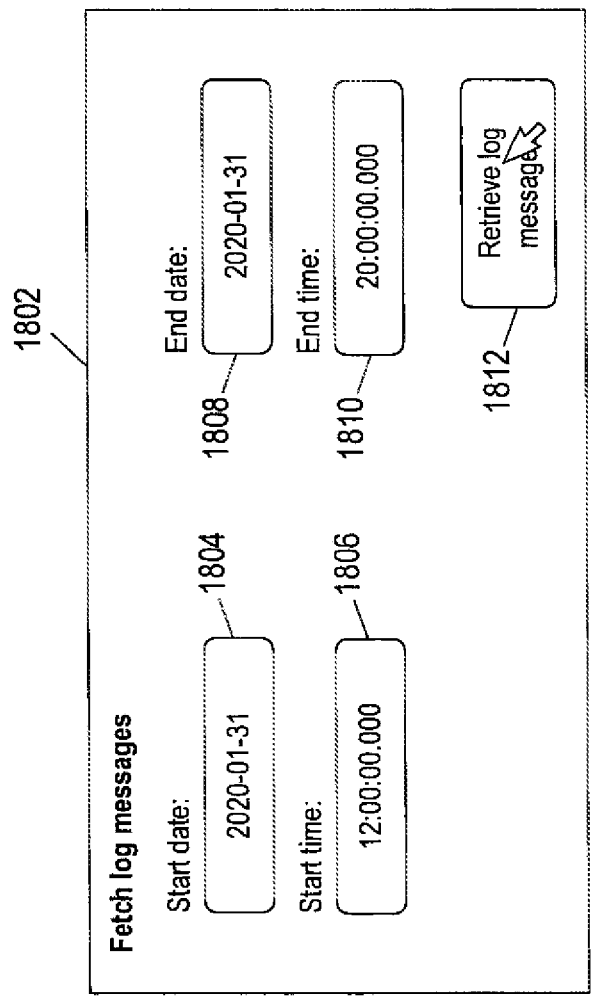
FIG. 18 shows an example graphical user interface that enables a user to input a start time and date and an end time and date of a query time interval for requesting log messages.

FIG. 18 shows an example GUI 1802 that enables a user to input a start time and date and an end time and date of a query time interval for requesting log messages. The GUI includes a start date field 1804, a start time field 1806, an end date field 1808, and an end time field 1810. In the example of FIG. 18, a user has entered an eight-hour query time interval with a start date of Jan. 31, 2020 and start time of 12:00:00.000 and an end date of Jan. 31, 2020 and end time of 20:00:00.000. The start date and time $t_{start}$ equals Jan. 31, 2020 12:00:00.000. The end date and time $t_{end}$ equals Jan. 31, 2020 20:00:00.000. The user clicks on the "retrieve log messages" button 1812 to initiate retrieval of log messages within the query time interval $[t_{start}, t_{end}]$ from a log-pattern database 1702 and a time-series metric database 1704.

When the query time interval $[t_{start}, t_{end}]$ is a subset of the recent time interval $[t_c-T, t_c]$ (i.e., $[t_{start}, t_{end}] \subset [t_c-T, t_c]$), log messages are retrieved from the live storage database 806. When the query time interval $[t_{start}, t_{end}]$ does not intersect or overlap the recent time interval $[t_c-T, t_c]$ (i.e., $[t_{start}, t_{end}] \cap [t_c-T, t_c] = \emptyset$, where $\emptyset$ denotes the null set), log messages are re-constructed from log patterns in the log-pattern database 1702 and metric objects in the time-series metric database 1704. When a portion of the query time interval $[t_{start}, t_{end}]$ intersects or overlaps the recent time interval $[t_c-T, t_c]$ (i.e., $[t_{start}, t_{end}] \cap [t_c-T, t_c] \neq \emptyset$), log messages with time stamps in both the query time interval and the recent time interval are retrieved from the live storage database 806 and log messages in the portion of the query time interval $[t_{start}, t_{end}]$ that does intersect the recent time interval $[t_c-T, t_c]$ are re-constructed from log patterns in the log-pattern database 1702 and metric objects in the time-series metric database 1704.

Methods retrieve metric objects with time stamps in the portion of the query time interval $[t_{start}, t_{end}]$ that does not intersect with the recent time interval from the time-series metric database 1704. Log IDs of the metric objects are used to retrieve corresponding log patterns with the same log IDs from the log-pattern database 1702.

Figure 19:
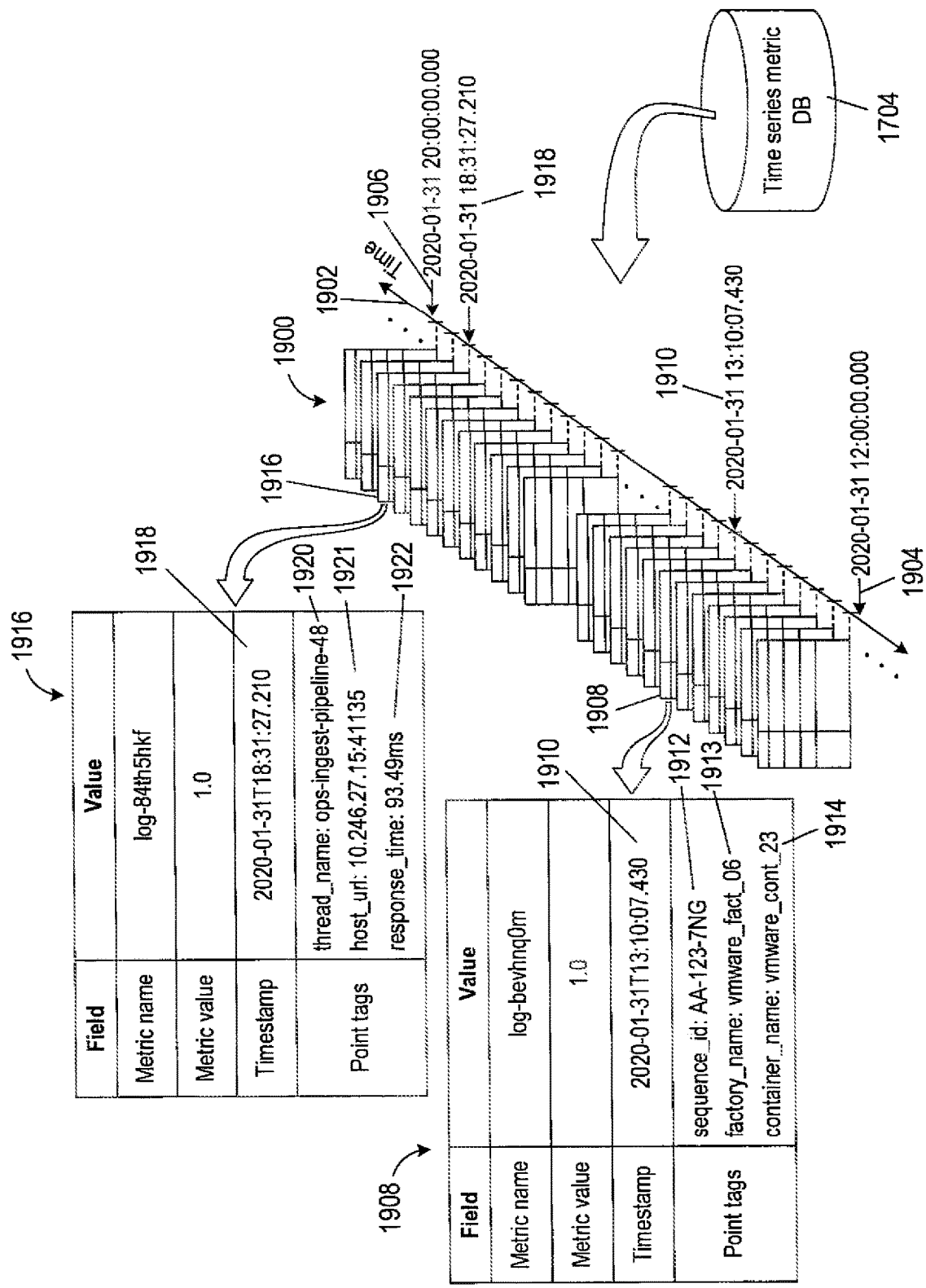
FIG. 19 shows an example of metric objects stored in a time-series metric database with time stamps in the query time interval of FIG. 18.

FIG. 19 shows an example of metric objects 1900 that are stored in the time-series metric database 1704 and have time stamps in the query time interval entered in FIG. 18. Note that in this example the query time interval $[t_{start}, t_{end}]$ does not intersect the recent time interval $[t_c-T, t_c]$. Directional arrow 1902 represents a time axis. Arrow 1904 points to the start date and time Jan. 31, 2020 12:00:00.000 and arrow 1906 points to end date and time Jan. 31, 2020 20:00:00.000 along the time axis 1902 entered in the GUI 1802 of FIG. 18. FIG. 19 shows an expanded view of contents of a metric object 1908. The metric object 1908 records a log ID "log-behnq0m," a time stamp 1912 within the query time interval, and variable segments 1912-1914. FIG. 19 shows an expanded view of contents of another metric object 1916. The metric object 1916 records a log ID "log-84th5hkf," a time stamp 1918 also within the query time interval, and variable segments 1920-1922.

The log IDs of the metric objects within the query time interval are used to retrieve log patterns with the same log IDs from the log-pattern database. For each of the metric objects, the time stamp and other variable segments of a metric object replace corresponding placeholders in a log pattern with the same log ID as the metric object to re-construct a log message with the same fixed segments as the log pattern and the same variable segments as the metric object. The resulting log messages are reconstructed log messages of previously generated log messages.

Figure 20A:
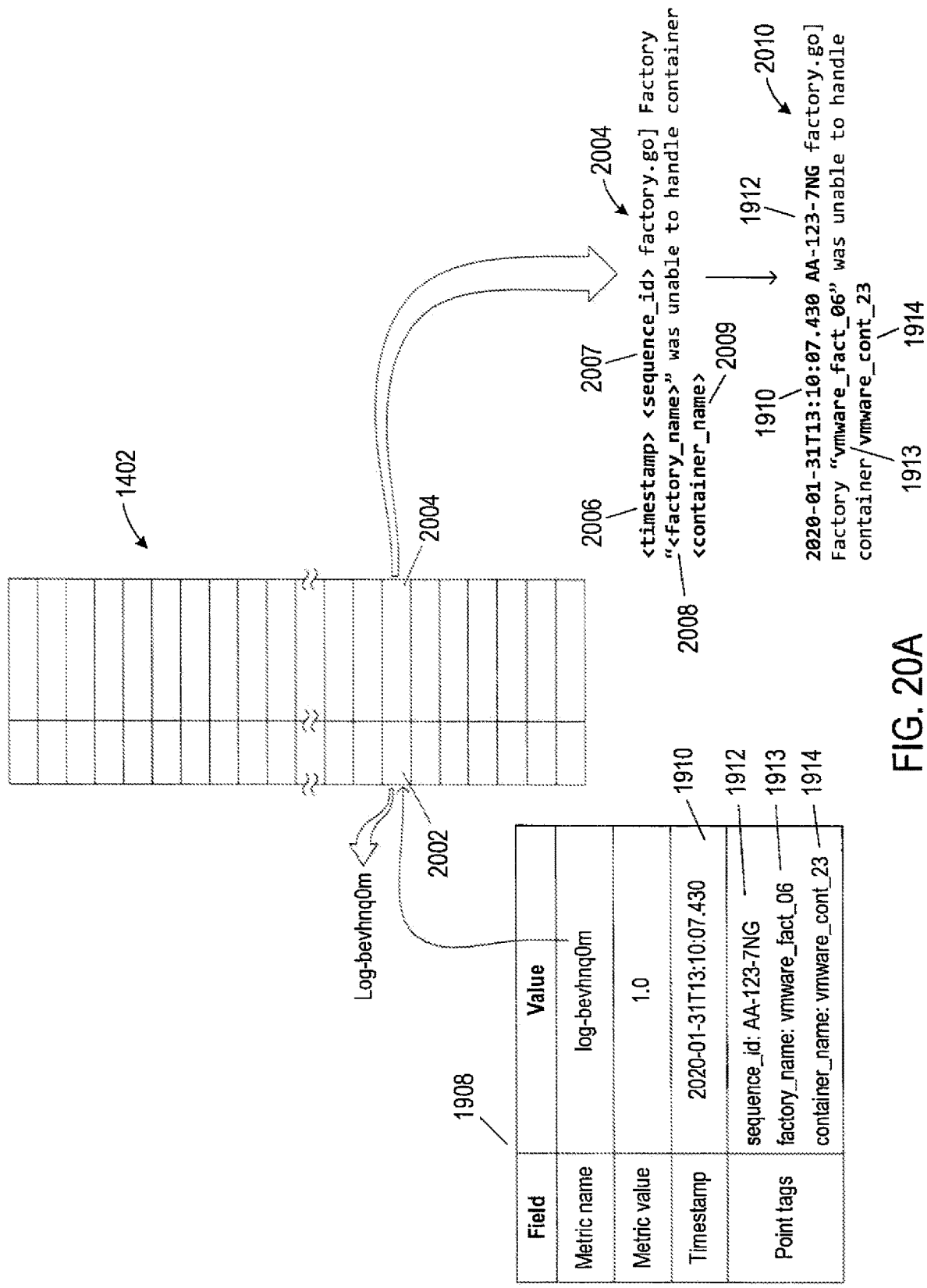
FIGS. 20A-20B show examples of retrieving log patterns from a log-pattern table with log IDs that correspond to log IDs of the metric objects in FIG. 19.
Figure 20B:
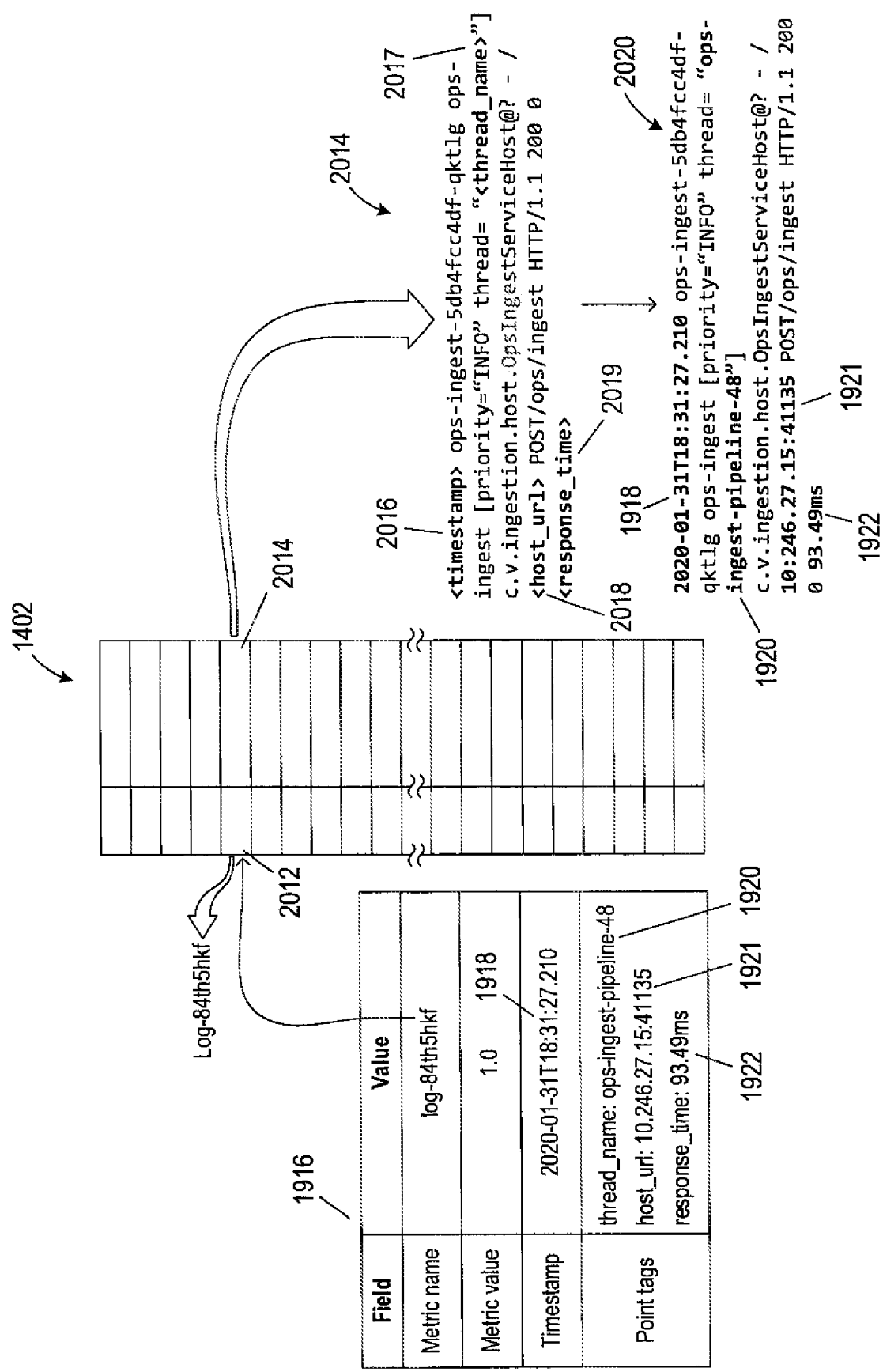

FIGS. 20A-20B show examples of retrieving log patterns from the log-pattern table 1402 with log IDs that correspond to the log IDs of the metric objects 1908 and 1916 in FIG. 19. In FIG. 20A, log ID "log-bevhnq0m" of the metric object 1908 corresponds to log ID 2002 of the log-pattern table 1402, which in turn corresponds to log pattern 2004. FIG. 20A shows an expanded view of the log pattern 2004 with placeholders 2006-2009. The time stamp 1910 and other variable segments 1912-1914 of the metric object 1908 replace the placeholders 2006-2009 of the log pattern 2004 to obtain reconstructed log message 2010. In FIG. 20B, log ID "log-84th5hkt" of the metric object 1916 corresponds to log ID 2012 of the log-pattern table 1402, which in turn corresponds to log pattern 2014. FIG. 20B shows an expanded view of the log pattern 2014 with placeholders 2016-2019. The time stamp 1918 and other variable segments 1920-1921 of the metric object 1916 replace the placeholders 2016-2019 of the log pattern 2014 to obtain reconstructed log message 2020.

The log messages retrieved from the live storage database and/or reconstructed from log patterns in the log-pattern database and metric objects in the time-series metric database are sorted from most recent to oldest based on time stamps and may be grouped based on the log patterns. The log messages associated with each log pattern may be counted and displayed in a GUI.

Figure 21:
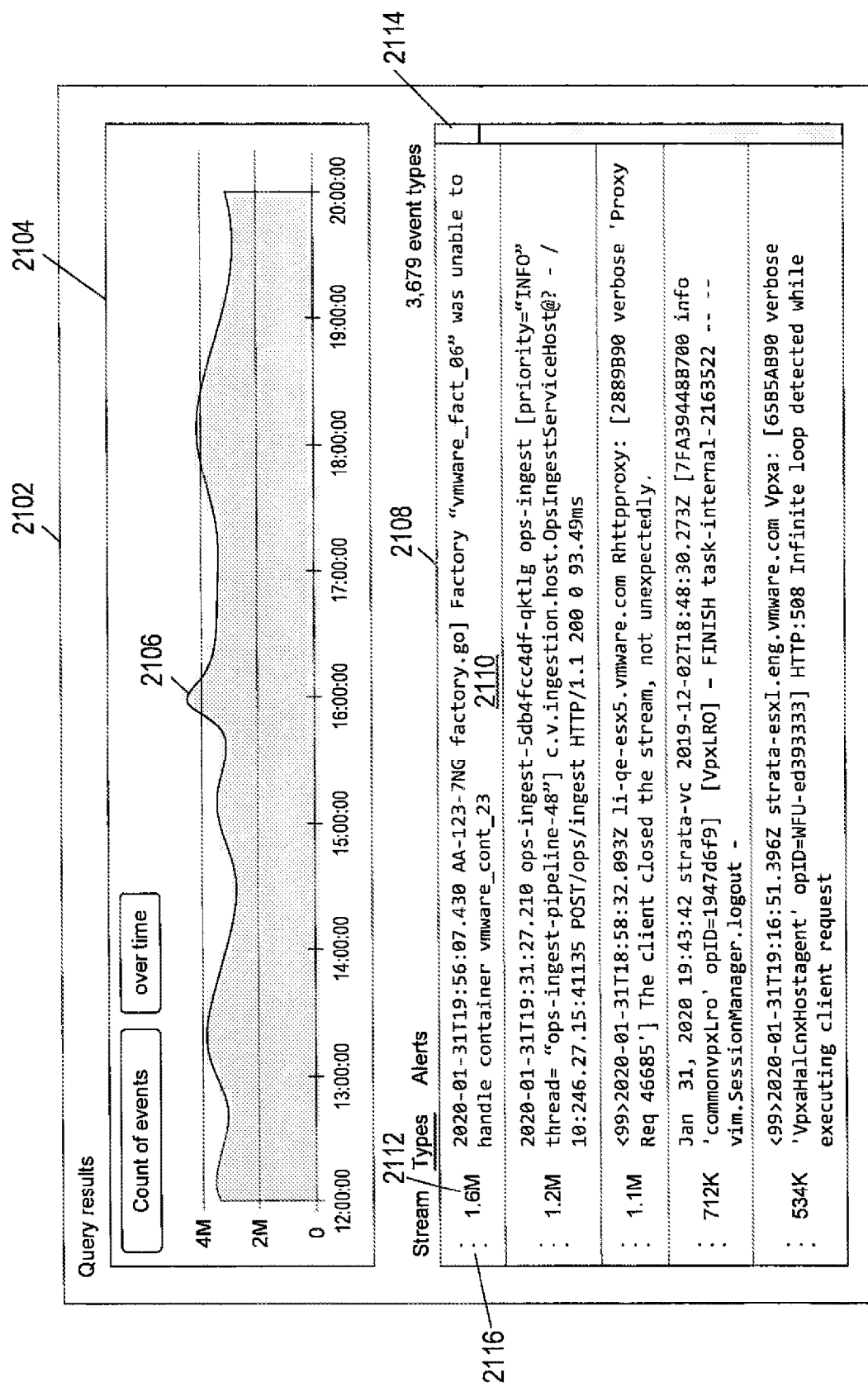
FIG. 21 shows an example graphical user interface that displays examples of reconstructed log messages.

FIG. 21 shows an example GUI 2102 that displays examples of reconstructed log messages obtained as described above in response to the hypothetical request made in FIG. 18. Window 2104 displays a graph 2106 of the number of log messages received by the log management tool between the start time 12:00:00 and end time 20:00:00 of the query time interval input in the GUI 1802 of FIG. 18. Entries in window 2108 show a representative log messages of the different types of log messages generated in the query time interval and a count of each type of log message generated in the query time interval. For example, entry 2110 displays a most recent log message of a set of log messages that correspond to the log pattern 2004 and in the query time interval. The set of log messages comprises 1.6 million 2112 log messages. Scroll bar 2114 enables a user to scroll through various different types of log messages. A user may click on vertical menu icons to view and scroll through the log messages comprising each type of log messages. For example, a user may also click on vertical menu icon 2116 to view and scroll through all the log messages represented by the log message 2110 and generated in the query time interval.

Figure 22A:
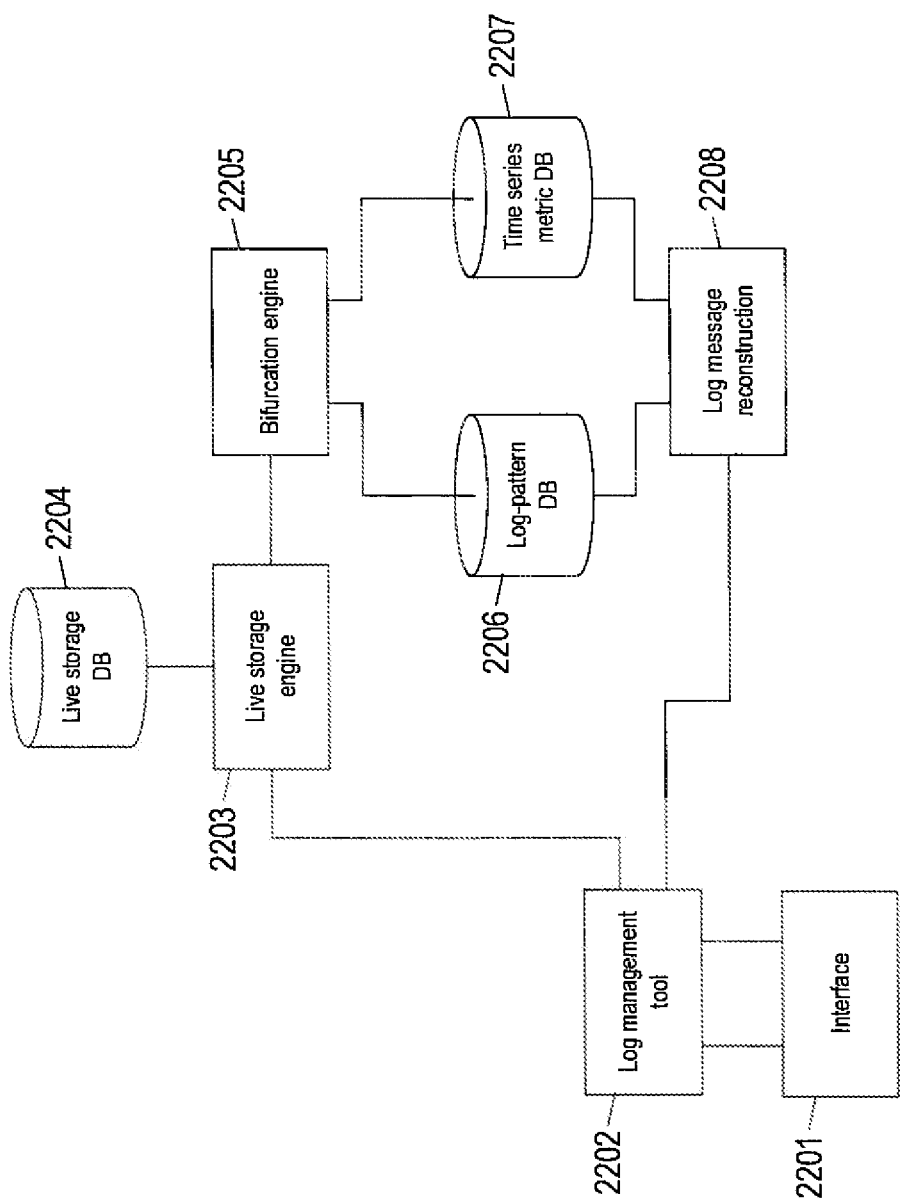
FIGS. 22A-22C show an example architecture of a system for storing and querying log messages.
Figure 22B:
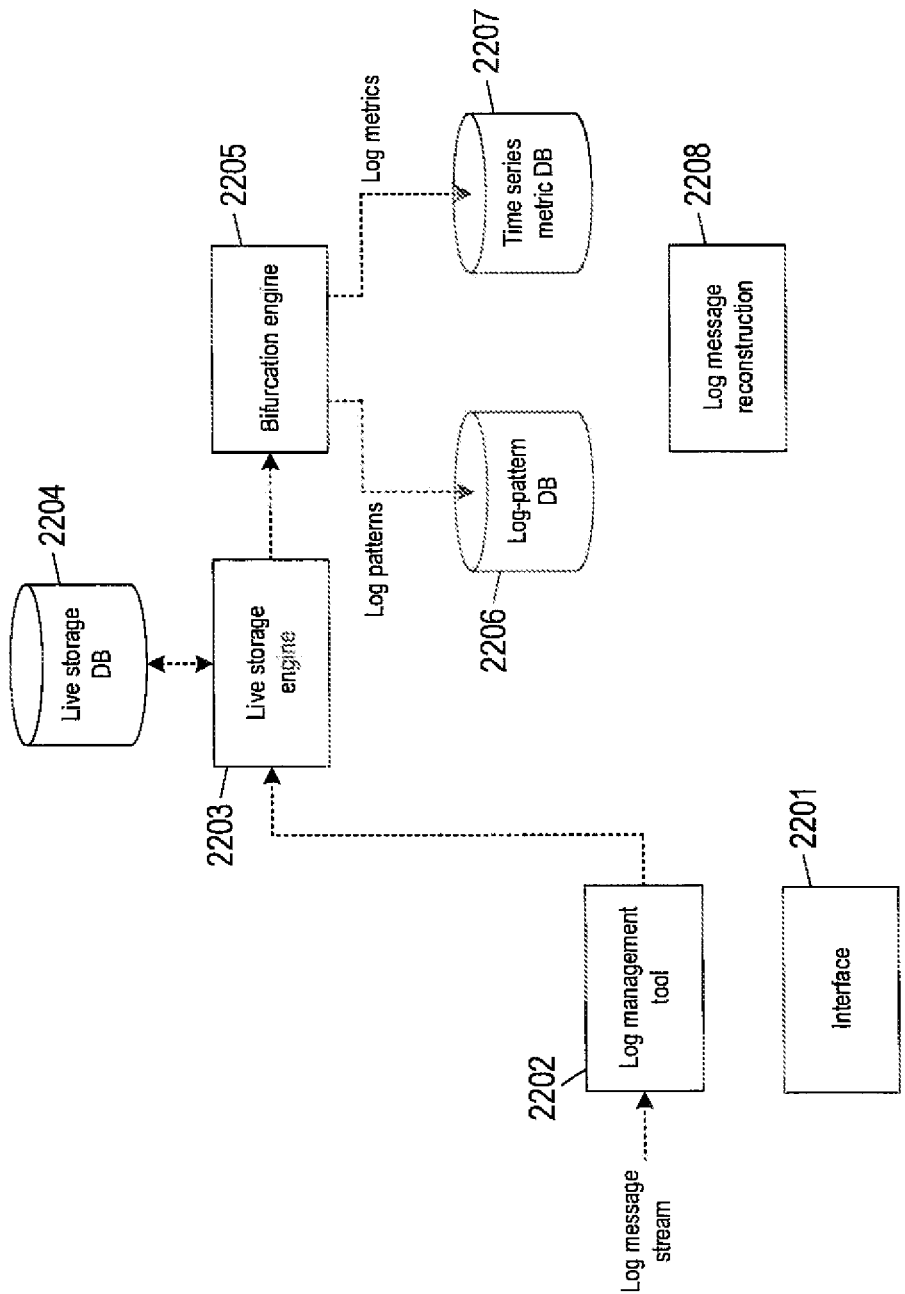
Figure 22C:
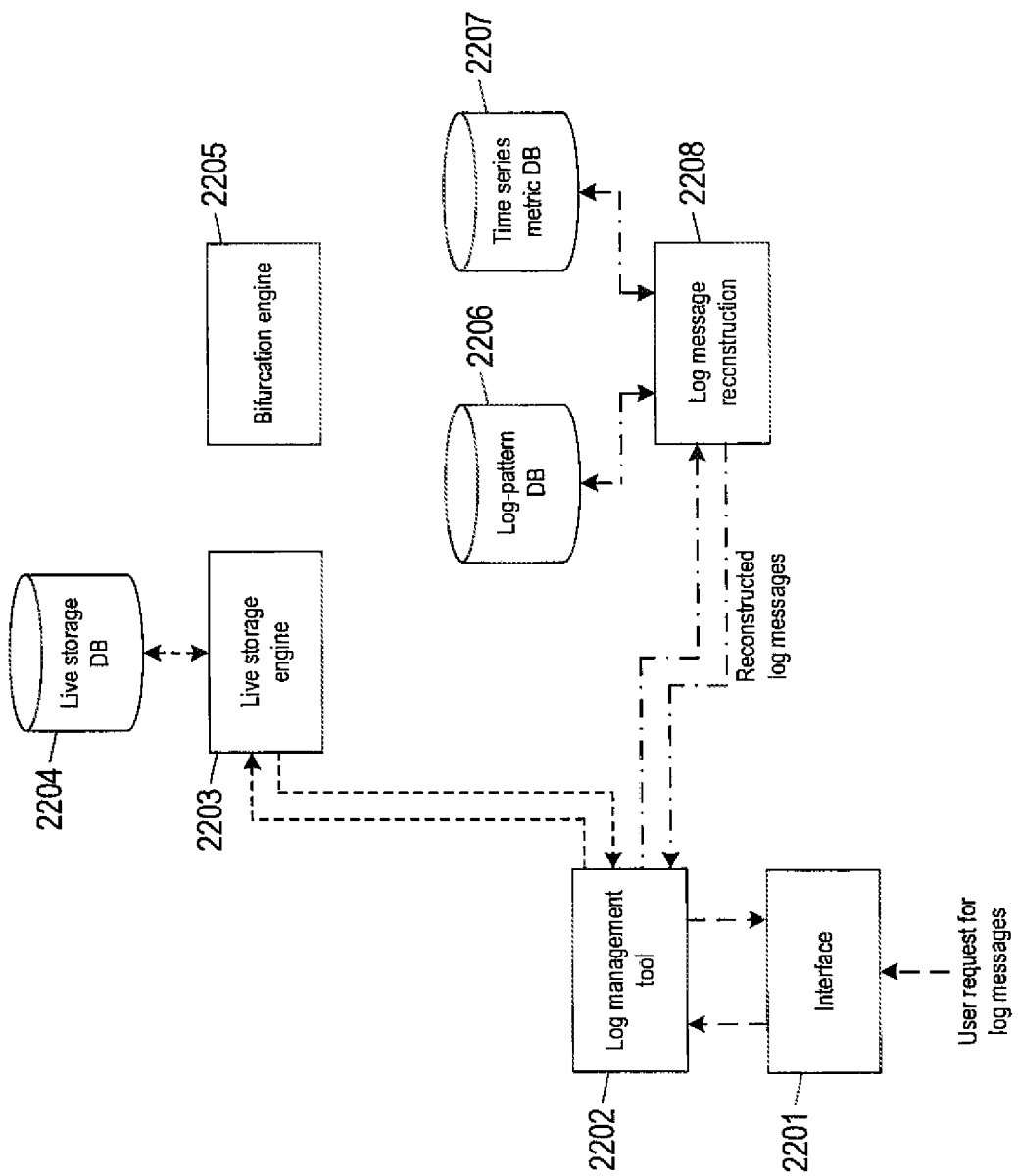

FIGS. 22A-22C show an example architecture of a system for storing and querying log messages. The system may be executed in the log management server. In FIG. 22A, the system comprises an interface 2201, a log management tool 2202, a live storage engine 2203 and a live storage database 2204. The system also comprises a bifurcation engine 2205, a log-pattern database 2206, a time-series metric database 2207, and a log message reconstruction engine 2208.

In FIG. 22B, dotted-line arrows represent processes associated with storing log messages in data bases. The log management tool 2202 receives a stream of log messages from one or more event sources executing in a distributed computing system. The log management tool 2202 sends the log messages to the live storage engine 2203, which stores the log messages in the live storage database 2204 as described above with reference to FIG. 8. The live storage engine 2201 identifies log messages with time stamps older than an end time $t_c-T$ in the live storage database 2204, copies the log messages to a log-message archive list that is sent to the bifurcation engine 2205, and deletes the log message from the live storage database 2204, as described above with reference to FIG. 9. The bifurcation engine 2205 creates a log pattern and a log ID for each log message in the log-message archive list that does not have a log pattern in a log-pattern table stored in the log-pattern database 2206 and stores the log pattern and associated log ID as a pair of entries in the log-pattern database 2206 as described above with reference to FIGS. 10-14. The bifurcation engine 2205 also creates a metric object for each log message in the log-message archive list, assigns a log ID of the log pattern that matches the log message to the metric object, and stores metric objects in the time-series metric database 2207, as described above with reference to FIGS. 15-16B.

In FIG. 22C, long-dashed arrows represent the interface 2201 receiving a user request for the log messages recorded in a query time interval $[t_{start}, t_{end}]$ as described above with reference to FIG. 18. Short dashed-line arrows represent retrieval of log messages from the live storage database 2204 where the query time interval $[t_{start}, t_{end}]$ overlaps with or is within the recent time interval $[t_c-T, t_c]$. The log messages are copied from the live storage database 2204 and the copies are sent to the interface 2201. Dot-dashed arrows represent a process of reconstructing log messages where the query time interval $[t_{start}, t_{end}]$ does not intersect or overlap with the recent time interval $[t_c-T, t_c]$ or the query time interval $[t_{start}, t_{end}]$ intersects or overlaps only a portion of the recent time interval $[t_c-T, t_c]$. Log messages with time stamps in both the query time interval and the recent time interval are copied from the live storage database 2204 and sent to the interface 2201 via the log management tool 2202. Log messages that are not stored in the live storage database 2204 are re-constructed from log patterns in the log-pattern database 2206 and metric objects in the time-series metric database 2207 as described above with reference to FIGS. 19-20B. The reconstructed log messages are sent to the interface 2201 via the log management tool 2202.

Figure 23:
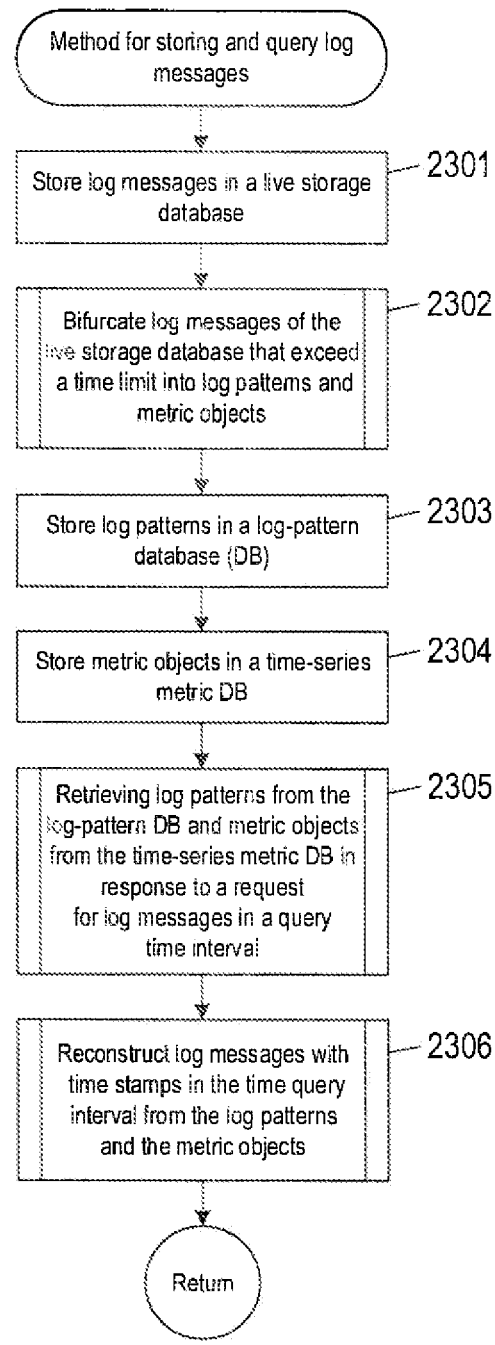
FIG. 23 is a flow diagram of a method for storing and querying log messages.
Figure 24:
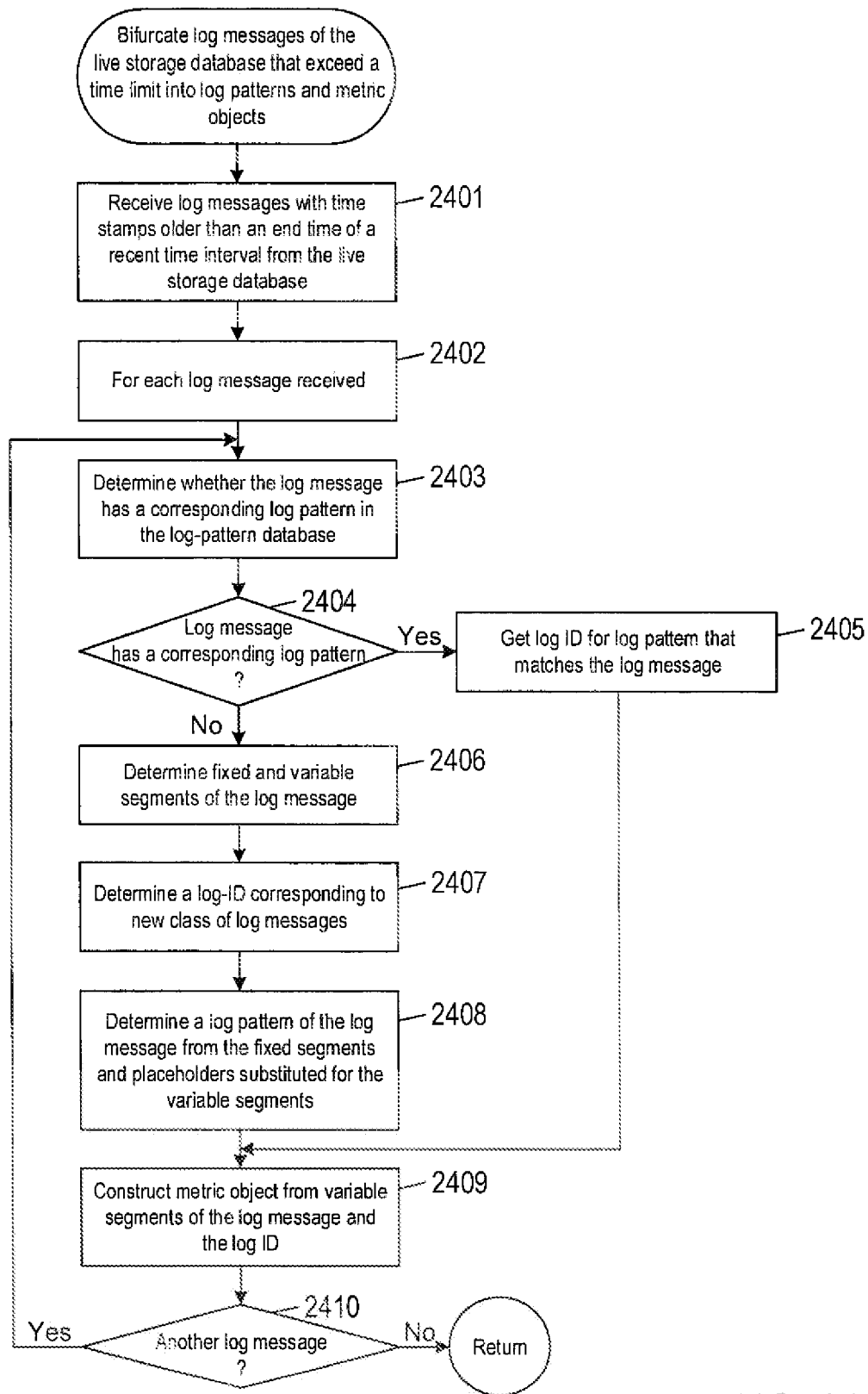
FIG. 24 is a flow diagram illustrating an example implementation of the "bifurcate log messages of the live storage database that exceed a time limit into log patterns and metric objects" procedure performed in FIG. 23.
Figure 25:
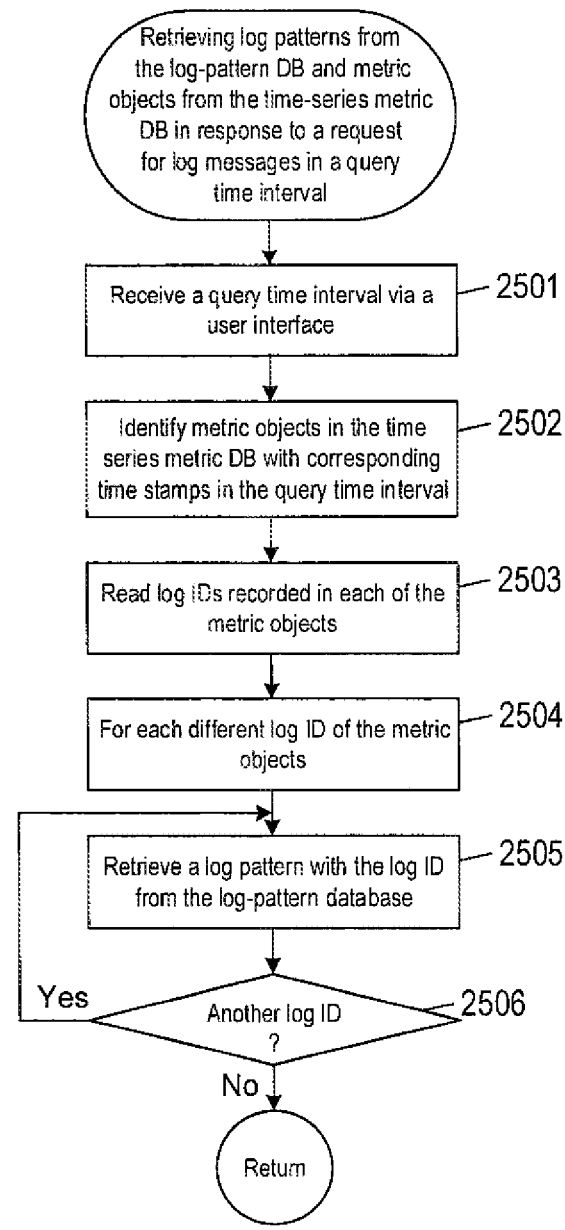
FIG. 25 is a flow diagram illustrating an example implementation of the "retrieving log patterns from the log-pattern DB and metric objects from the time-series metric DB in response to a request for log messages in a query time interval" procedure performed in FIG. 23.

The methods described below with reference to FIGS. 23-25 are stored in one or more data-storage devices as machine-readable instructions and executed by one or more processors of the computer system shown in FIG. 27.

FIG. 23 is a flow diagram of a method for storing and querying log messages. In block 2301, log messages receiver from event sources of a distributed computing system are stored in a live storage database as described above with reference to FIG. 8 and FIG. 22B. In block 2302, a "bifurcate log messages of the live storage database that exceed a time limit into log patterns and metric objects" procedure is performed. An example implementation of the "bifurcate log messages of the live storage database that exceed a time limit into log patterns and metric objects" procedure is described below with reference to FIG. 24. The time limit is the amount of time a log message is permitted to be stored in the live storage database. In block 2303, the log patterns obtained in block 2302 are stored in a log-pattern database as described above with reference to FIGS. 9-14 and FIG. 22B. In block 2304, the metric objects obtained in block 2303 are stored in a time-series metric database as described above with reference to FIGS. 15-16B and FIG. 22B. In block 2305, a "retrieving log patterns from the log-pattern DB and metric objects from the time-series metric DB in response to a request for log messages in a query time interval" procedure is performed. An example implementation of the "retrieving log patterns from the log-pattern DB and metric objects from the time-series metric DB in response to a request for log messages in a query time interval" procedure is described below with reference to FIG. 25. In block 2306, a "reconstruct log messages with time stamps in the time query interval from the log patterns and the metric objects" procedure is performed. An example implementation of the "reconstruct log messages with time stamps in the time query interval from the log patterns and the metric objects" procedure is described below with reference to FIG. 26.

FIG. 24 is a flow diagram illustrating an example implementation of the "bifurcate log messages of the live storage database that exceed a time limit into log patterns and metric objects" procedure performed in block 2302. In block 2401, log messages with time stamps older than an end time $t_c-T$ of a recent time interval are received from the live storage database as described above with reference to FIGS. 8 and 9. A loop beginning with block 2402 repeats operations represented by blocks 2403-2409 for each log message received. In block 2403, whether a log message has a corresponding log pattern in the log-pattern database is determined as described above. In decision block 2404, when a log message has a corresponding log pattern in the log-pattern database, control flows to block 2405. Otherwise, control flows to block 2406. In block 2405, a log ID of the log pattern that matches the log message is copied from the log-pattern database. In block 2406, fixed segments and variable segments of the log messages are determined as described above with reference to FIGS. 10-13. In block 2407, a log ID corresponding to a new class of log messages is determined as described above with reference to FIG. 11A-11B. In block 2408, a log pattern of the log message is determined from the fixed segments and the placeholders substituted for the variable segments of the log message. In block 2409, a metric object is constructed tor the log message from variable segments. In decision block 2410, blocks 2403-2409 are repeated for another log message.

FIG. 25 is a flow diagram illustrating an example implementation of the "retrieving log patterns from the log-pattern DB and metric objects from the time series metric DB in response to a request for log messages in a query time interval" procedure performed in block 2305. In block 2501, a query time interval is received via a graphical user interface as described above with reference to FIG. 18. In block 2502, metric objects with time stamps in the query time interval are identified in the time-series metric database as described above with reference to FIG. 19. In block 2503, a log ID is read from each of the metric objects identified in block 2502. A loop beginning with block 2504 repeats the operation represented by block 2505 for each different log ID of the metric objects obtained in block 2503. In block 2505, a log pattern associated with each of the different log IDs is retrieved from the log-pattern database. In decision block 2506, the operation represented by block 2505 is repeated for another log ID.

Figure 26:
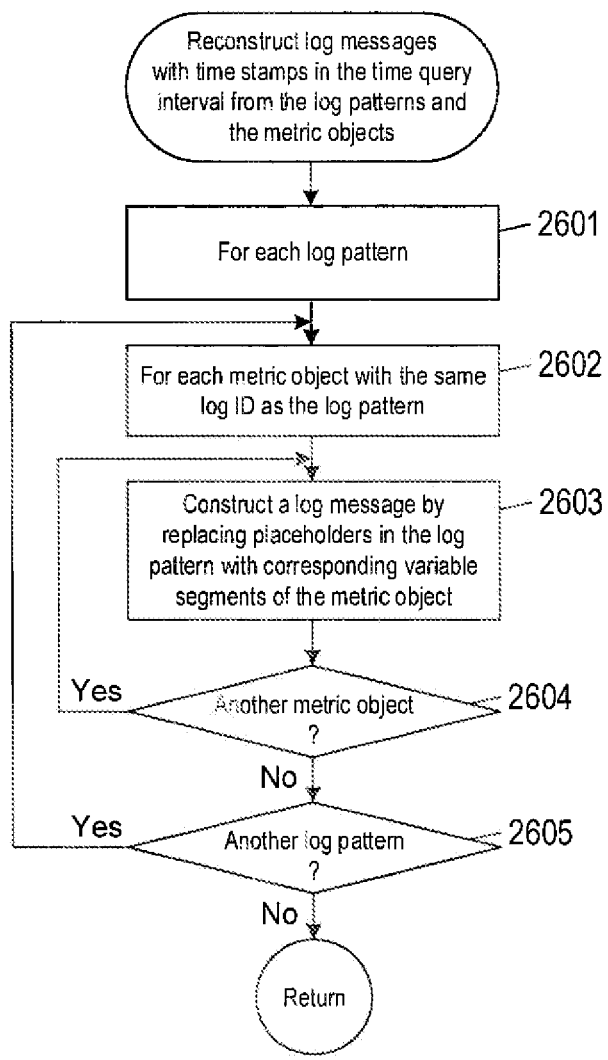
FIG. 26 is a flow diagram illustrating an example implementation of the "reconstruct log messages with time stamps in the time query interval from the log patterns and the metric objects" procedure performed in FIG. 23.

FIG. 26 is a flow diagram illustrating an example implementation of the "reconstruct log messages with time stamps in the time query interval from the log patterns and the metric objects" procedure performed in block 2306. A loop beginning with block 2601 repeats the operations represented by blocks 2602-2604 for each log pattern obtained in block 2505 of FIG. 25. A loop beginning with block 1602 repeats the operations represented by block 2603 for each metric object with time stamps in the query time interval. In block 2603, a log message is constructed from a log pattern and metric object with the same log ID by replacing the placeholders of the log pattern with corresponding variable segments recorded in the metric object. In decision block 2604, the operation represented by block 2603 is repeated for another metric object with the same log ID as the log pattern. In decision block 2605, the operations represented by blocks 2602-2604 are repeated for another log pattern.

Figure 27:
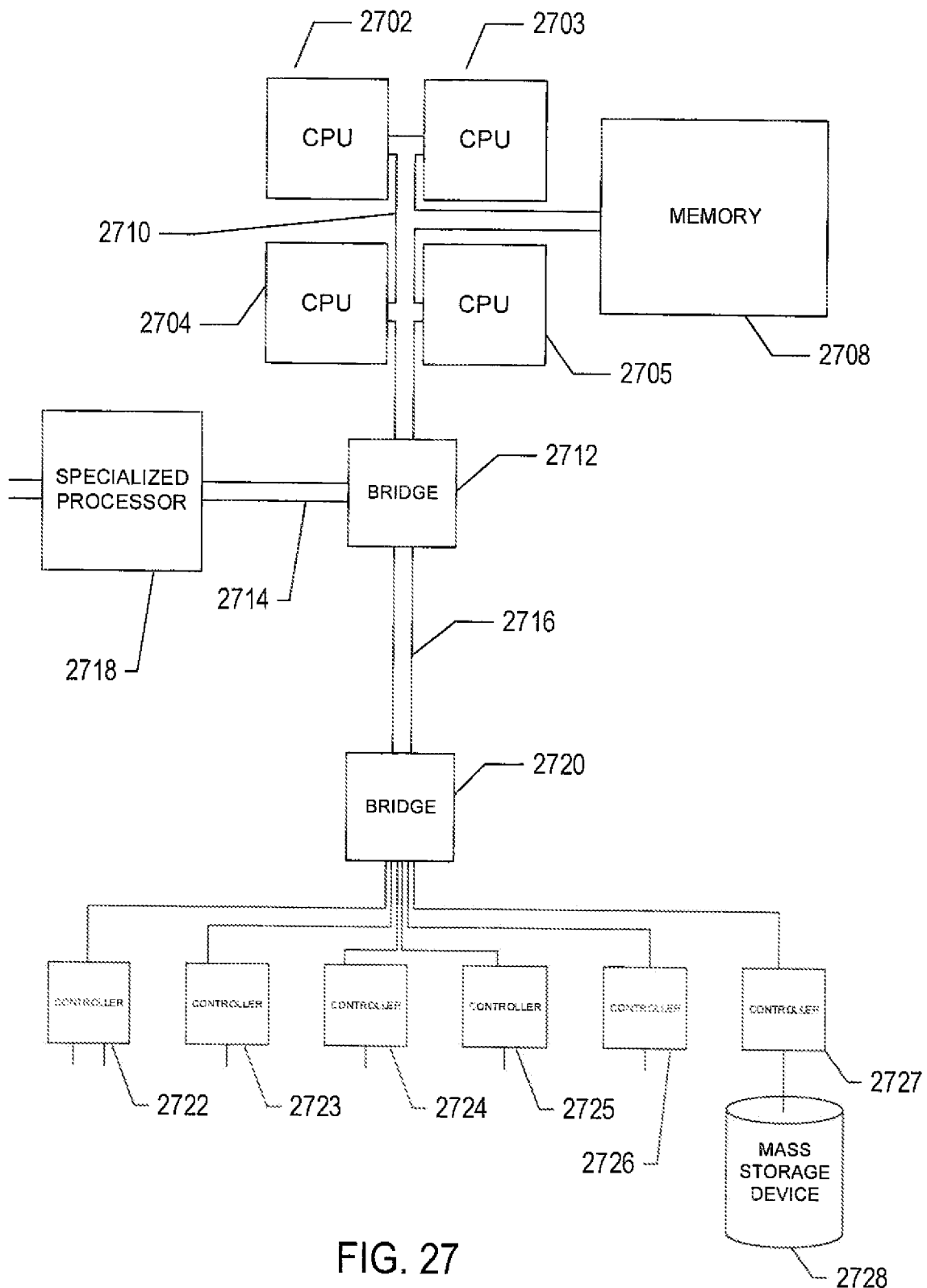
FIG. 27 shows an example of a computer system that executes operations performed by a log management server.

FIG. 27 shows an example of a computer system that executes a method for storing and querying log messages as described above. The internal components of many small, mid-sized, and large computer systems as well as specialized processor-based storage systems can be described with respect to this generalized architecture, although each system may feature many additional components, subsystems, and similar, parallel systems with architectures similar to this generalized architecture. Computers that receive, process, and store log messages may be described by the general architectural diagram shown in FIG. 27, for example. The computer system contains one or multiple central processing units ("CPUs") 2702-2705, one or more electronic memories 2708 interconnected with the CPUs by a CPU/memory-subsystem bus 2710 or multiple busses, a first bridge 2712 that interconnects the CPU/memory-subsystem bus 2710 with additional busses 2714 and 2716, or other types of high-speed interconnection media, including multiple, high-speed serial interconnects. These busses or serial interconnections, in turn, connect the CPUs and memory with specialized processors, such as a graphics processor, and with one or more additional bridges 2720, which are interconnected with high-speed serial links or with multiple controllers 2722-2727, such as controller 2727, that provide access to various different types of mass-storage devices 2728, electronic displays, input devices, and other such components, subcomponents, and computational devices. It should be noted that computer-readable data-storage devices include optical and electromagnetic disks, electronic memories, and other physical data-storage devices.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method stored in one or more data-storage devices and executed using one or more processors of a computer system for storing and querying log messages generated by event sources in a distributed computing system, the method comprising:
    storing log messages generated by the event sources in a live storage database;
    for each log message of the live storage database that exceeds a time limit for storage in the live storage database and has a corresponding log pattern in a log-pattern database, getting a log identification (ID) for the log message from a log-pattern table stored in the log-pattern database;
    for each log message of the live storage database that exceeds the time limit and does not have a corresponding log pattern in the log-pattern database,
        determining fixed segments and variable segments of the log message,
        determining a log ID corresponding to a new class of log messages that includes the log message,
        determining a log pattern from the fixed segments and placeholders substituted for the variable segments of the log message, and
        storing the log pattern in the log-pattern database;
    for each log message of the live storage database that exceeds the time limit, constructing a metric object from variable segments of the log message and the log ID of the log message;
    storing the metric object in a time-series metric database;
    retrieving log patterns from the log-pattern database and metric objects from the time-series metric database in response to a request for log messages in a query time interval; and
    reconstructing log messages with time stamps in the query time interval from the log patterns retrieved from the log-pattern database and the metric objects retrieved from the time-series metric database.

2. The method of claim 1 wherein retrieving log patterns from the log-pattern database and metric objects from the time-series metric database in response to a request for log messages in a query time interval: receiving a query time interval via a user interface; identifying metric objects in the time-series database with corresponding time stamps in the query time interval; reading log IDs recorded in each metric object of the metric objects; and retrieving a log pattern from the log-pattern database for each different log ID.

3. The method of claim 1 wherein reconstructing log messages with time stamps in the query time interval comprises: for each log pattern with a log ID that corresponds to at least one metric object with a time stamp in the query time interval, for each metric object of the metric objects with the log ID, replacing placeholders in the log pattern with corresponding variable segments of the metric object to obtain a log message with a time stamp in the query time interval.

4. The method of claim 1 wherein reconstructing log messages with the time stamps in the query time interval comprises the query time interval not overlapping a recent time interval for retaining log messages in the live storage database.

5. The method of claim 1 wherein reconstructing log messages with time stamps in the query time interval comprises: reconstructing log messages with time stamps in a portion of the query time interval that does not overlap a recent time interval for retaining log messages in the live storage database; and copying log messages with time stamps in a portion of the query time interval that overlaps with the recent time interval from the live storage database.

6. The method of claim 1 further comprises displaying reconstructed log messages with time stamps in the query time interval in graphical user interface.

7. A computer system for storing and querying log messages generated by event sources in a distributed computing system, the system comprising:
    one or more processors;
    one or more data-storage devices; and
    machine-readable instructions stored in the one or more data-storage devices that when executed using the one or more processors controls the computer system to perform operations comprising:
    storing log messages generated by the event sources in a live storage database;
    for each log message of the live storage database that exceeds a time limit for storage in the live storage database and has a corresponding log pattern in a log-pattern database, getting a log identification (ID) for the log message from a log-pattern table stored in the log-pattern database;
    for each log message of the live storage database that exceeds the time limit and does not have a corresponding log pattern in the log-pattern database,
        determining fixed segments and variable segments of the log message,
        determining a log ID corresponding to a new class of log messages that includes the log message, determining a log pattern from the fixed segments and placeholders substituted for the variable segments of the log message, and storing the log pattern in the log-pattern database;

for each log message of the live storage database that exceeds the time limit, constructing a metric object from variable segments of the log message and the log ID of the log message;

storing the metric object in a time-series metric database;

retrieving log patterns from the log-pattern database and metric objects from the time-series metric database in response to a request for log messages in a query time interval; and reconstructing log messages with time stamps in the query time interval from the log patterns retrieved from the log-pattern database and the metric objects retrieved from the time-series metric database.

8. The computer system of claim 7 wherein retrieving log patterns from the log-pattern database and metric objects from the time-series metric database in response to a request for log messages in a query time interval: receiving a query time interval via a user interface; identifying metric objects in the time-series database with corresponding time stamps in the query time interval; reading log IDs recorded in each metric object of the metric objects; and retrieving a log pattern from the log-pattern database for each different log ID.

9. The computer system of claim 7 wherein reconstructing log messages with time stamps in the query time interval comprises: for each log pattern with a log ID that corresponds to at least one metric object with a time stamp in the query time interval, for each metric object of the metric objects with the log ID, replacing placeholders in the log pattern with corresponding variable segments of the metric object to obtain a log message with a time stamp in the query time interval.

10. The computer system of claim 1 wherein reconstructing log messages with the time stamps in the query time interval comprises the query time interval not overlapping a recent time interval for retaining log messages in the live storage database.

11. The computer system of claim 7 wherein reconstructing log messages with time stamps in the query time interval comprises: reconstructing log messages with time stamps in a portion of the query time interval that does not overlap a recent time interval for retaining log messages in the live storage database; and copying log messages with time stamps in a portion of the query time interval that overlaps with the recent time interval from the live storage database.

12. The computer system of claim 7 further comprises displaying reconstructed log messages with time stamps in the query time interval in a graphical user interface.

13. A non-transitory computer-readable medium encoded with machine-readable instructions that implement a method carried out by one or more processors of a computer system to perform operations comprising:

storing log messages generated by event sources in a live storage database;

for each log message of the live storage database that exceeds a time limit for storage in the live storage database and has a corresponding log pattern in a log-pattern database, getting a log identification LID, for the log message from a log-pattern table stored in the log-pattern database;

for each log message of the live storage database that exceeds the time limit and does not have a corresponding log pattern in the log-pattern database, determining fixed segments and variable segments of the log message, determining a log ID corresponding to a new class of log messages that includes the log message, determining a log pattern from the fixed segments and placeholders substituted for the variable segments of the log message, and storing the log pattern in the log-pattern database;

for each log message of the live storage database that exceeds the time limit, constructing a metric object from variable segments of the log message and the log ID of the log message;

storing the metric object in a time-series metric database;

retrieving log patterns from the log-pattern database and metric objects from the time-series metric database in response to a request for log messages in a query time interval; and reconstructing log messages with time stamps in the query time interval from the log patterns retrieved from the log-pattern database and the metric objects retrieved from the time-series metric database.

14. The medium of claim 13 wherein retrieving log patterns from the log-pattern database and metric objects from the time-series metric database in response to a request for log messages in a query time interval: receiving a query time interval via a user interface; identifying metric objects in the time-series database with corresponding time stamps in the query time interval; reading log IDs recorded in each metric object of the metric objects; and retrieving a log pattern from the log-pattern database for each different log ID.

15. The medium of claim 13 wherein reconstructing log messages with time stamps in the query time interval comprises: for each log pattern with a log ID that corresponds to at least one metric object with a time stamp in the query time interval, for each metric object of the metric objects with the log ID, replacing placeholders in the log pattern with corresponding variable segments of the metric object to obtain a log message with a time stamp in the query time interval.

16. The medium of claim 13 wherein reconstructing log messages with the time stamps in the query time interval comprises the query time interval not overlapping a recent time interval for retaining log messages in the live storage database.

17. The medium of claim 13 wherein reconstructing log messages with time stamps in the query time interval comprises: reconstructing log messages with time stamps in a portion of the query time interval that does not overlap a recent time interval for retaining log messages in the live storage database; and copying log messages with time stamps in a portion of the query time interval that overlaps with the recent time interval from the live storage database.

18. The medium of claim 13 further comprises displaying reconstructed log messages with time stamps in the query time interval in a graphical user interface.

* * * * *